United States Patent
Van Steenwyk

(10) Patent No.: US 9,815,514 B2
(45) Date of Patent: Nov. 14, 2017

(54) VEHICLE STEERING SYSTEM

(71) Applicant: MOTOR CYCLE INNOVATION PTY LTD, Milton (AU)

(72) Inventor: Raymond Noel Van Steenwyk, Ashgrove (AU)

(73) Assignee: MOTOR CYCLE INNOVATION PTY LTD, Milton (AU)

( * ) Notice: Subject to any disclaimer, the term of this patent is extended or adjusted under 35 U.S.C. 154(b) by 178 days.

(21) Appl. No.: 14/651,819

(22) PCT Filed: Dec. 10, 2013

(86) PCT No.: PCT/AU2013/001432
§ 371 (c)(1),
(2) Date: Jun. 12, 2015

(87) PCT Pub. No.: WO2014/089607
PCT Pub. Date: Jun. 19, 2014

(65) Prior Publication Data
US 2015/0307152 A1  Oct. 29, 2015

(30) Foreign Application Priority Data
Dec. 13, 2012 (AU) ................................ 2012905462

(51) Int. Cl.
*B62K 21/00* (2006.01)
*B60G 3/18* (2006.01)
(Continued)

(52) U.S. Cl.
CPC ............ *B62K 21/005* (2013.01); *B60G 3/185* (2013.01); *B62K 11/02* (2013.01); *B62K 21/02* (2013.01);
(Continued)

(58) Field of Classification Search
CPC ...... B62K 21/005; B62K 11/02; B62K 21/02; B62K 25/24; B60G 3/185; B60G 2204/421
See application file for complete search history.

(56) References Cited

U.S. PATENT DOCUMENTS 4,723,621 A * 2/1988 Kawano ................. B62K 25/24
                                              180/219
4,807,898 A * 2/1989 Huntly .................. B62K 25/24
                                              280/276
(Continued)

FOREIGN PATENT DOCUMENTS

DE       198 23 002 A1    11/1999
EP       0 235 040 A2      9/1987
(Continued)

OTHER PUBLICATIONS

International Preliminary Report on Patentability dated Jun. 16, 2015 for PCT/AU2013/001432 (4 pages).
(Continued)

*Primary Examiner* — Kevin Hurley
*Assistant Examiner* — Marlon A Arce
(74) *Attorney, Agent, or Firm* — Wolf, Greenfield & Sacks, P.C.

(57) ABSTRACT

A vehicle including a body, a first and second swing arm assembly each pivotally mounted to the body, at least one wheel support arm pivotally mounted to the first swing arm assembly, an axle coupled to the wheel support arm, a wheel hub pivotally mounted to the axle, the wheel hub rotatably supporting at least one wheel in use, a support member pivotally mounted to the second swing arm assembly and either the wheel support arm or the first swing arm assembly. At least one steering arm pivotally connected to the support member and coupled to the wheel hub, wherein the steering arm, wheel support arm, and the support member are provided in a substantially triangular arrangement, a steering input pivotally mounted to the body and a steering coupling for connecting the steering arm to the steering input.

20 Claims, 15 Drawing Sheets

(51) Int. Cl.
*B62K 25/24* (2006.01)
*B62K 11/02* (2006.01)
*B62K 21/02* (2006.01)

(52) U.S. Cl.
CPC ........ *B62K 25/24* (2013.01); *B60G 2204/421* (2013.01); *B60G 2300/12* (2013.01)

(56) References Cited

U.S. PATENT DOCUMENTS

| | | |
|---|---|---|
| 7,641,015 B2 | 1/2010 | Hasegawa et al. |
| 7,806,217 B2 | 10/2010 | Hasegawa et al. |
| 7,887,077 B2 * | 2/2011 | Thiers ..................... B60G 3/14 180/6.24 |

FOREIGN PATENT DOCUMENTS

| | | |
|---|---|---|
| EP | 0122161 B1 | 6/1988 |
| EP | 1045792 B1 | 10/2003 |
| EP | 13861938.2 | 10/2015 |
| WO | PCT/AU2013/001432 | 6/2015 |

OTHER PUBLICATIONS

International Search Report for PCT/AU2013/001432, dated Jan. 29, 2014 (4 pages).
Extended European Search Report for European Application No. 13861938.2, dated Oct. 30, 2015.

\* cited by examiner

VEHICLE STEERING SYSTEM

RELATED CASE INFORMATION

This application is a 371 U.S. National Stage Application of International Application No. PCT/AU2013/001432, filed on Dec. 10, 2013, which claims priority to Australian application no. 2012905462, filed on Dec. 13, 2012.

BACKGROUND OF THE INVENTION

The present invention relates to a vehicle and in particular a vehicle steering system for use with a vehicle such as a motorbike, or the like.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Vehicles typically include steering and suspension mechanisms, which may be integrated or provided separately. For example, motorbikes commonly include a telescopic fork arrangement which functions to provide both steering and suspension. In this regard, two telescopic forks extend from a set of handlebars to an axle which supports the front wheel. Pivoting of the handlebars causes corresponding movement of the forks and hence axle, thereby allowing the front wheel to be steered. Additionally, the telescopic forks include suspension components such as springs or dampers, thereby allowing relative motion between the wheel and bike chassis. In this respect, when the vehicle encounters anomalous or rough terrain, the impact of the front wheel on the terrain is partially absorbed by the internal suspension components such that the front wheel substantially maintains contact with the terrain.

However, such standard telescopic fork arrangements are known to suffer from a number of disadvantages, including inherent instability in steering, in which the fork arrangement can behave as two elongate levers that are subject to undesirable horizontal and lateral movement. This further causes the telescopic portions of the fork to experience increased stiction in the down tubes which hampers suspension and can cause a sluggish response to steering input via the handlebars.

In addition, telescopic fork arrangements can cause the vehicle to dive while braking, known as 'brake dive', and this phenomenon is particularly pronounced during emergency braking. In this situation, as the brakes are applied the load on the front wheel of the vehicle increases leading to compression and shortening of the suspension element included in the telescopic forks. As a consequence, if the compression of the forks is too severe, for example if the forks reach full compression and 'bottom out', this can cause severe handling difficulties.

Additional disadvantages include the inherent nature of a steered suspension, such as the telescopic forks, in which any shock load forces applied to the front wheel are amplified and transferred high and forward of the centre of gravity of the vehicle, thus necessitating a strong and heavy vehicle design.

Other types of fork arrangements for use in motorcycles and other vehicles are also known, including trailing links, leading links, and the like, however these systems all suffer from one or more similar disadvantages to the telescopic fork.

Less commonly, motorbikes have steering and suspension apparatus provided separately in the vehicle, and in one example, in hub centre steering (HCS) arrangements. Typically HCS arrangements include steering apparatus coupled to a hub in the centre of a wheel which pivots relative to a fixed axle provided therethrough, in order to provide steering. In addition, the axle is typically coupled to suspension apparatus in order to absorb any shock loads from road anomalies and the like.

Straight line stability and quick turning on motorcycles is to a large extent diametrically opposed and as such engineers must compromise between either a stable bike in the forward direction at speed, by using a large rake and trail angle (long wheel base), which also exhibits slow handling characteristics into a corner, or, an unstable bike in the forward direction at speed, by using a low (or steep) rake and trail angle (short wheel base), which exhibits quick (sometimes referred to as 'nervous') steering into a corner. Both are beneficial to a motorcycles ultimate performance, but, especially on a telescopic system they are mutually exclusive. One can only be had without the other.

U.S. Pat. No. 7,806,217 describes a motorcycle including a front part having a steering mechanism with which a front wheel is steered based on the manipulation of the steering of a steering handle, and a swing mechanism extending from either a body frame or an engine for movably supporting the steering mechanism. The steering mechanism is connected to the swing mechanism via a lower spherical bearing and an upper spherical bearing.

U.S. Pat. No. 7,686,115 describes a suspension and steering system for the front wheel of a motorcycle. The system includes an upright extending along one side of the front wheel at a rake angle, to which the wheel is join nailed by means of a cantilevered axle extending from one side of the lower end of the upright. The upright includes a lower section that resides within the inner diameter of the wheel rim and an arcuate upper section that extends upwardly and rearwardly around the wheel rim and tire. The upper end of the upright is connected to a telescoping, splined steering shaft that is journalled to an upper subframe and which transmits steering torque from a handlebar assembly through the upright to the front wheel. The upright is pivotably attached to upper and lower swing arms that extend forwardly from the body of the motorcycle. The lower swing arm extends around the side of the front wheel and functions to locate the lower section of the upright. The upper swing arm is connected to the upper end of the upright and is sprung and damped with a shock absorber assembly connected to the upper subframe. The upright bears and transmits substantially all weight and shock loads between the front wheel and the upper swing arm and body of the motorcycle, allowing the steering shaft to function exclusively to transmit steering torque to the front wheel.

However, arrangements such as U.S. Pat. No. 7,686,115 are known to suffer from a number of disadvantages, including the inherent asymmetry of the design, which leads to unbalanced load properties that are detrimental to handling and performance. In addition, the aesthetics of the design differ significantly from traditional arrangements, in a conservative industry such as motorcycling, this typically leads to very low market acceptance.

Generally, HCS arrangements are known to provide more stability than fork arrangements. Because an HCS system separates suspension from steering from braking and holds the steering axis directly at its source (the hub centre) this mitigates some of the shortcomings of telescopic systems and can result in improved inline stability while having a steeper rake and trail angle. A HCS motorcycle can, in theory, have the benefits of both worlds while reducing the wheelbase of the motorcycle thus reducing overall weight.

However, attempts at HCS design to date have also included a number of drawbacks including large king pin stress loads resulting from the construction of the king-pin and its bearings, meaning flexure or high tolerance results in wheel lateral displacement, a critical parameter of stability, which can cause oscillations that in turn hamper direct and stable steering and lead to dangerous phenomenon such as tank slapping.

In addition, HCS vehicles typically require wide swing arms in order to accommodate the front wheel, resulting in poor ground clearance in corner lean angles. Single sided variations of HCS systems typically have additional torsion loads, however this can lead to vehicle imbalance. Furthermore, some HCS vehicles to date tend to suffer from poor 'steering feel', in which the removal of the steering mechanism from a fork arrangement causes slack and inconsistent handlebar movement.

Typical HCS vehicles also have little or no capacity to alter or modify the rake angle, trail, or pro- or anti-dive characteristics and thus users are constrained to utilising a particular geometry in all situations.

Additionally, as mentioned above, a further major disadvantage of previous HCS systems is their radical departure from the conventional look of telescopic forks. Motorcycle riders have in the past been inherently conservative and have thus shied away from alternate front end systems.

Thus, although HCS vehicles have existed for almost 100 years, due to the disadvantages and limitations outlined above, they are yet to achieve any sustained commercial success.

SUMMARY OF THE PRESENT INVENTION

The present invention seeks to ameliorate one or more of the problems associated with the prior art.

In a first broad for the present invention seeks to provide a vehicle including:
a) a body;
b) a first swing arm assembly including a first end pivotally mounted to the body;
c) at least one wheel support arm including a first end pivotally mounted to a second end of the first swing arm assembly;
d) an axle coupled to a second end of the at least one wheel support arm;
e) a wheel hub pivotally mounted to the axle, the wheel hub rotatably supporting at least one wheel in use;
f) a second swing arm assembly including a first end pivotally mounted to the body;
g) a support member pivotally mounted to a second end of the second swing arm assembly and at least one of:
  i) a first end of the at least one wheel support arm; and,
  ii) pivotally mounted to a second end of the first swing arm assembly;
h) at least one steering arm having a first end pivotally connected to the support member and a second end coupled to the wheel hub, wherein the at least one steering arm, the at least one wheel support arm, and the support member are provided in a substantially triangular arrangement;
i) a steering input pivotally mounted to the body; and,
j) a steering coupling for connecting the at least one steering arm to the steering input.

Typically the at least one steering arm and the wheel hub pivot about a steering axis, the steering axis being parallel with a mid-plane of the vehicle.

Typically the at least one wheel support arm pivots relative to the first swing arm assembly about an axis extending perpendicularly relative to a mid-plane of the vehicle.

Typically the second swing arm assembly pivots relative to the body about an axis extending perpendicularly relative to a mid-plane of the vehicle.

Typically the support member pivots relative to the second end of the first swing arm assembly about an axis extending perpendicularly relative to a mid-plane of the vehicle.

Typically the support member pivots relative to the second end of the second swing arm assembly about an axis extending perpendicularly relative to a mid-plane of the vehicle.

Typically the vehicle includes at least one support strut coupled to the support member and the wheel support arm.

Typically the support member and the second end of the second swing arm assembly are pivotally mounted via an adjustable coupling.

Typically the adjustable coupling allows a user to modify a relative position of a pivotal connection between the second end of the second swing arm assembly and the support member.

Typically the adjustable coupling includes a rotatable disc including the pivotal connection offset from a centre of the rotatable disc.

Typically the second swing arm assembly includes an extendable member for allowing a user to modify a length of the second swing arm assembly.

Typically the steering arms are coupled to the support arm via an adjustable member.

Typically the adjustable member allows a user to modify an orientation of a steering axis.

Typically at least one of the adjustable coupling, the extendable member, and the adjustable member, allow the user to modify at least one of a rake angle, and a trail angle.

Typically at least one of the adjustable coupling, the extendable member, and the adjustable member, allow the user to modify a steering axis angle.

Typically at least one of the adjustable coupling, the extendable member, and the adjustable member, allow the user to modify a degree of dive or anti-dive.

Typically the at least one steering arm includes two steering arms coupled together at the first ends.

Typically the steering arms are integrally formed.

Typically the first swing arm assembly includes laterally spaced swing arms, which in use are positioned on either side of a mid-plane of the vehicle.

Typically the two first swing arms are coupled together via any one of:
  a) at least one axle; and,
  b) at least one strut, wherein the strut is any one of:
    i) integrally formed with the first swing arms; and,
    ii) mounted to the first swing arms.

Typically the at least one second swing arm assembly includes any one of:
  a) a substantially 'V'-shaped member; and
  b) two second swing arms.

Typically the first swing arm assembly and the second swing arm assembly are spaced apart in a direction parallel with a mid-plane of the vehicle.

Typically the at least one wheel support arm includes two wheel support arms provided on opposing sides of the wheel coupled together at first ends.

Typically the wheel support arms are integrally formed.

Typically the steering coupling allows for relative movement between the steering input and the at least one steering arm.

Typically the steering coupling includes any one of:
a) at least one shear link;
b) at least one push rod; and,
c) at least one telescoping tube.

Typically the at least one steering arm and the wheel hub pivot about a first steering axis parallel with a mid-plane of the vehicle, and wherein the steering input pivots relative to the body about a second steering axis parallel with the mid-plane.

Typically the first and second steering axes are any one of:
a) co-axial;
b) parallel; and,
c) not co-axial and not parallel.

Typically the vehicle includes a shock absorber coupled to the body and any one of the first swing arm assembly and the second swing arm assembly.

Typically the shock absorber includes a compressible portion.

Typically the compressible portion includes at least one of:
a) a coil;
b) a spring;
c) a linkage;
d) a telescoping tube;
e) a hydraulic cylinder; and,
f) a pneumatic cylinder.

Typically the shock absorber is coupled to the body to allow the first and second swing arm assemblies to pivot relative to the body when the compressible portion is compressed.

Typically the wheel hub is mounted to a shaft extending from the axle.

Typically the shaft is provided on an axis which is any one of:
a) substantially coincident with an axis of the axle; and,
b) offset from the axis of the axle.

Typically the vehicle includes hub centre steering.

Typically the vehicle includes at least one of:
a) a brake input;
b) a clutch input; and
c) an acceleration input.

Typically the steering input includes at least one of:
a) at least one handlebar; and,
b) at least one steering wheel.

Typically the body includes at least one of:
a) a chassis; and,
b) an engine.

In a second broad for the present invention seeks to provide a motorbike including:
a) a body;
b) a first swing arm assembly including a first end pivotally mounted to the body;
c) at least one wheel support arm including a first end pivotally mounted to a second end of the first swing arm assembly;
d) an axle coupled to a second end of the at least one wheel support arm;
e) a wheel hub pivotally mounted to the axle, the wheel hub rotatably supporting at least one wheel in use;
f) a second swing arm assembly including a first end pivotally mounted to the body;
g) a support member pivotally mounted to a second end of the second swing arm assembly and at least one of:
   i) a first end of the at least one wheel support arm; and,
   ii) pivotally mounted to a second end of the first swing arm assembly;
h) at least one steering arm having a first end pivotally connected to the support member and a second end coupled to the wheel hub, wherein the at least one steering arm, the at least one wheel support arm, and the support member are provided in a substantially triangular arrangement;
i) a steering input pivotally mounted to the body; and,
j) a steering coupling for connecting the at least one steering arm to the steering input.

In a third broad for the present invention seeks to provide a vehicle steering system for a vehicle including a body, the steering system including:
a) a first swing arm assembly including a first end pivotally mounted to a body;
b) at least one wheel support arm including a first end pivotally mounted to a second end of the first swing arm assembly;
c) an axle coupled to a second end of the at least one wheel support arm;
d) a wheel hub pivotally mounted to the axle, the wheel hub rotatably supporting at least one wheel in use;
e) a second swing arm assembly including a first end pivotally mounted to the body;
f) a support member pivotally mounted to a second end of the second swing arm assembly and at least one of:
   i) a first end of the at least one wheel support arm; and,
   ii) pivotally mounted to a second end of the first swing arm assembly;
g) at least one steering arm having a first end pivotally connected to the support member and a second end coupled to the wheel hub, wherein the at least one steering arm, the at least one wheel support arm, and the support member are provided in a substantially triangular arrangement;
h) a steering input pivotally mounted to the body; and,
i) a steering coupling for connecting the at least one steering arm to the steering input.

In a fourth broad for the present invention seeks to provide a vehicle including:
a) a body;
b) a first swing arm assembly including a first end pivotally mounted to the body;
c) at least one wheel support arm including a first end pivotally mounted to a second end of the first swing arm assembly;
d) an axle coupled to a second end of the at least one wheel support arm;
e) a wheel hub pivotally mounted to the axle, the wheel hub rotatably supporting at least one wheel in use;
f) a second swing arm assembly including a first end pivotally mounted to the body;
g) a support member pivotally mounted to a second end of the second swing arm assembly and at least one of:
   i) a first end of the at least one wheel support arm; and,
   ii) pivotally mounted to a second end of the first swing arm assembly;
h) at least one steering arm having a first end pivotally connected to the support member and a second end coupled to the wheel hub;
i) a steering input pivotally mounted to the body;

j) a steering coupling for connecting the at least one steering arm to the steering input; and, k) a shock absorber coupled to the body and any one of the first swing arm assembly and the second swing arm assembly.

BRIEF DESCRIPTION OF THE DRAWINGS

An example of the present invention will now be described with reference to the accompanying drawings, in which.

DETAILED DESCRIPTION OF THE PREFERRED EMBODIMENTS

Figure 1:
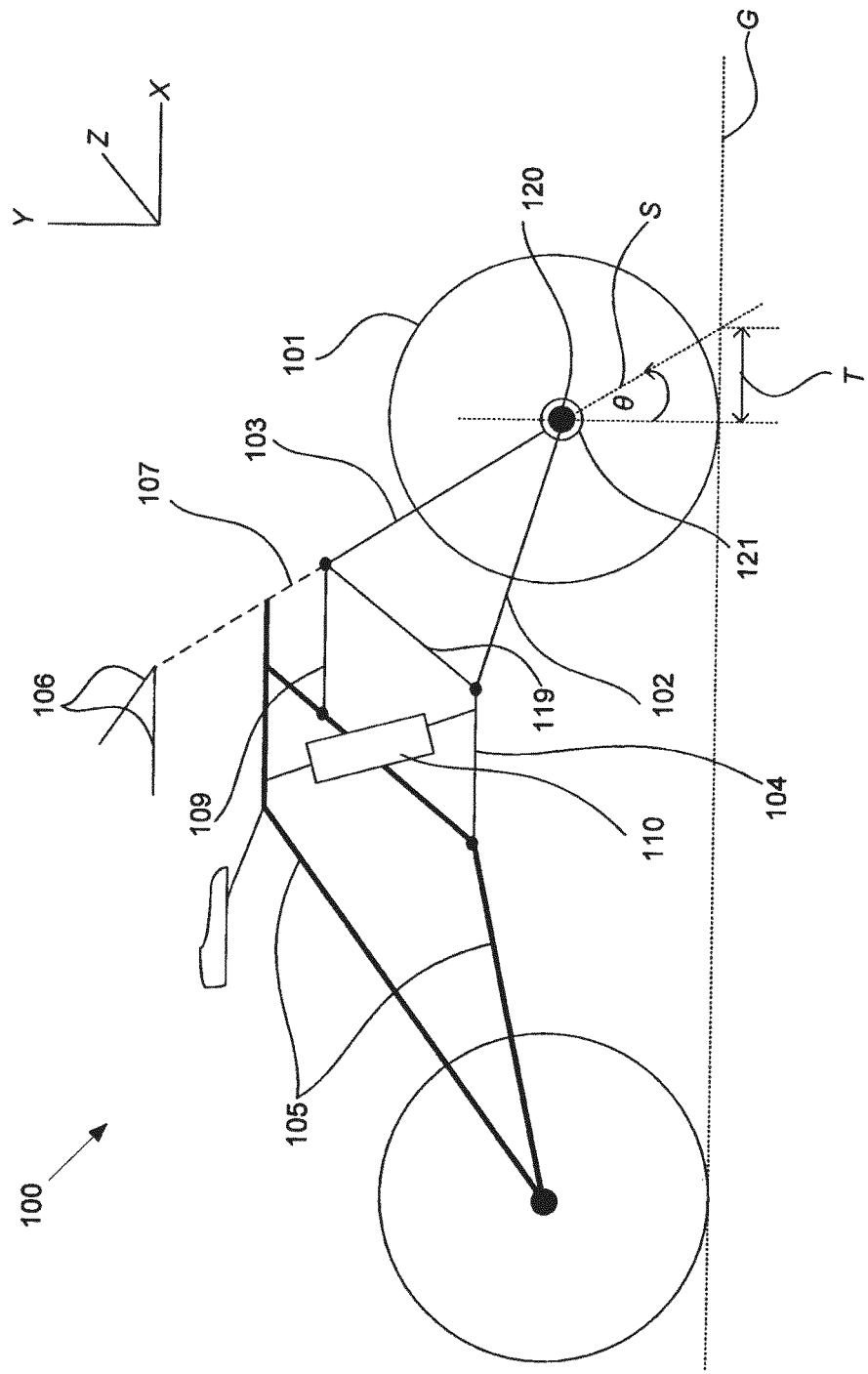
FIG. 1 is a schematic side view diagram of a first example of a vehicle including a steering system.

An example of a vehicle including a steering system will now be described with reference to FIG. 1.

In this example, the vehicle 100 includes a body 105, and a first swing arm assembly 104 including a first end pivotally mounted to the body 105. The vehicle 100 further includes one or more wheel support arms 102 including a first end pivotally mounted to a second end of the first swing arm assembly 104, with an axle 120 coupled to a second end of the wheel support arms 102. A wheel hub 121 is pivotally mounted to the axle 120, and in use the wheel hub 121 rotatably supports one or more wheels 101.

The vehicle 100 also includes a second swing arm assembly 109 including a first end pivotally mounted to the body 105. A support member 119 is pivotally mounted to a second end of the second swing arm assembly 109 and either mounted to a first end of the wheel support arms 102 or, pivotally mounted to a second end of the first swing arm assembly 104.

The vehicle 100 further includes one or more steering arms 103 having a first end pivotally connected to the support member 119 and a second end coupled to the wheel hub 121. The vehicle 100 also includes a steering input 106 pivotally mounted to the body 105, and a steering coupling 107 for connecting the steering arms 103 to the steering input 106.

According to the above described arrangement, turning of the wheel 101 is achieved through hub centre steering, in which the wheel hub 121 pivots relative to the axle 120, about a steering axis S, also known as a turning axis, to allow the wheel 101 to be steered.

The above described arrangement therefore provides greater stability than traditional arrangements. In particular, it ensures that structural support and suspension for the wheel 101 is provided by the wheel support arms 102 and the first and second swing arm assemblies 104, 109, whilst steering is accomplished separately. This allows the vehicle 100 to include the appropriate strength, rigidity, weight, and the like, optimised according to the intended function.

In this example the steering arm 103, the wheel support arm 102, and the support member 119 are further provided in a substantially triangular arrangement, attached to the body 105 via the first and second swing arm assemblies 104, 109. This arrangement ensures the steering arm 103 is supported at each end, via the wheel hub 121 at the second end, and via the second swing arm assembly 109 or support member 119 at the first end, which can improve the stability and strength of the steering arrangement.

The triangular arrangement creates a more robust and stronger wheel support which allows, if desired, the overall weight of the vehicle 100 to be reduced compared with traditional arrangements, hence also reducing the unsprung weight and increasing suspension and handling characteristics. In this respect, a lighter vehicle 100 can increase the power to weight ratio, which may be desirable in various applications, for example racing, and the like. Additionally, the triangular arrangement extends an elongated virtual king pin from the wheel hub 121, through the steering arm 103, thus increasing stability of the king pin and reducing the occurrence of king pin oscillation, for which previous arrangements were prone to experience, thus also improving steering and handling.

Accordingly, the above described steering system can provide increased strength, and stability, while retaining full suspension travel, even under breaking, to accommodate road anomalies, as will be discussed further below.

A number of further features will now be described.

Figure 2A:
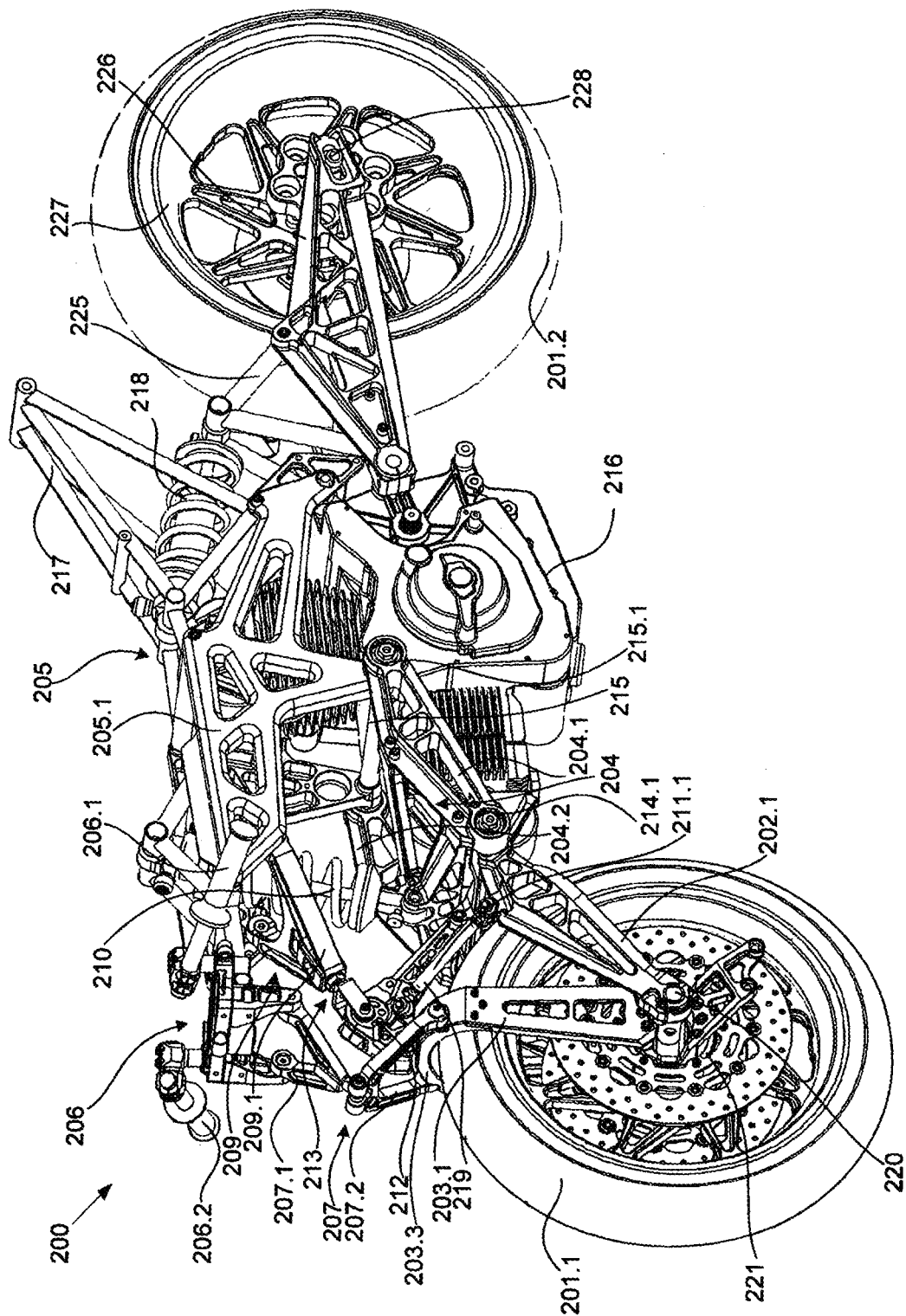
FIG. 2A is a schematic perspective view of a second example of a vehicle including a steering system.
Figure 2B:
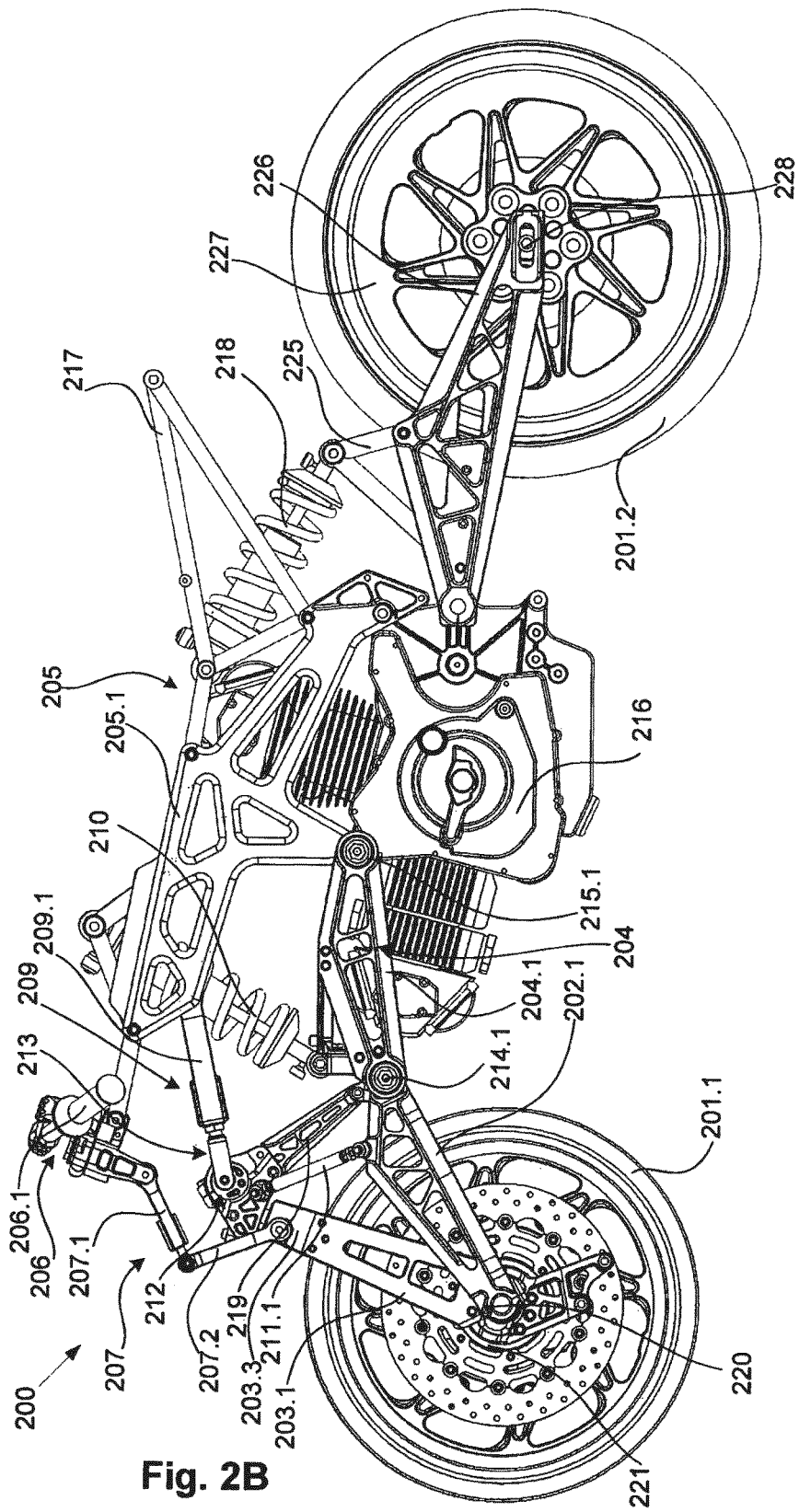
FIG. 2B is a schematic side view of the vehicle of FIG. 2A.
Figure 2C:
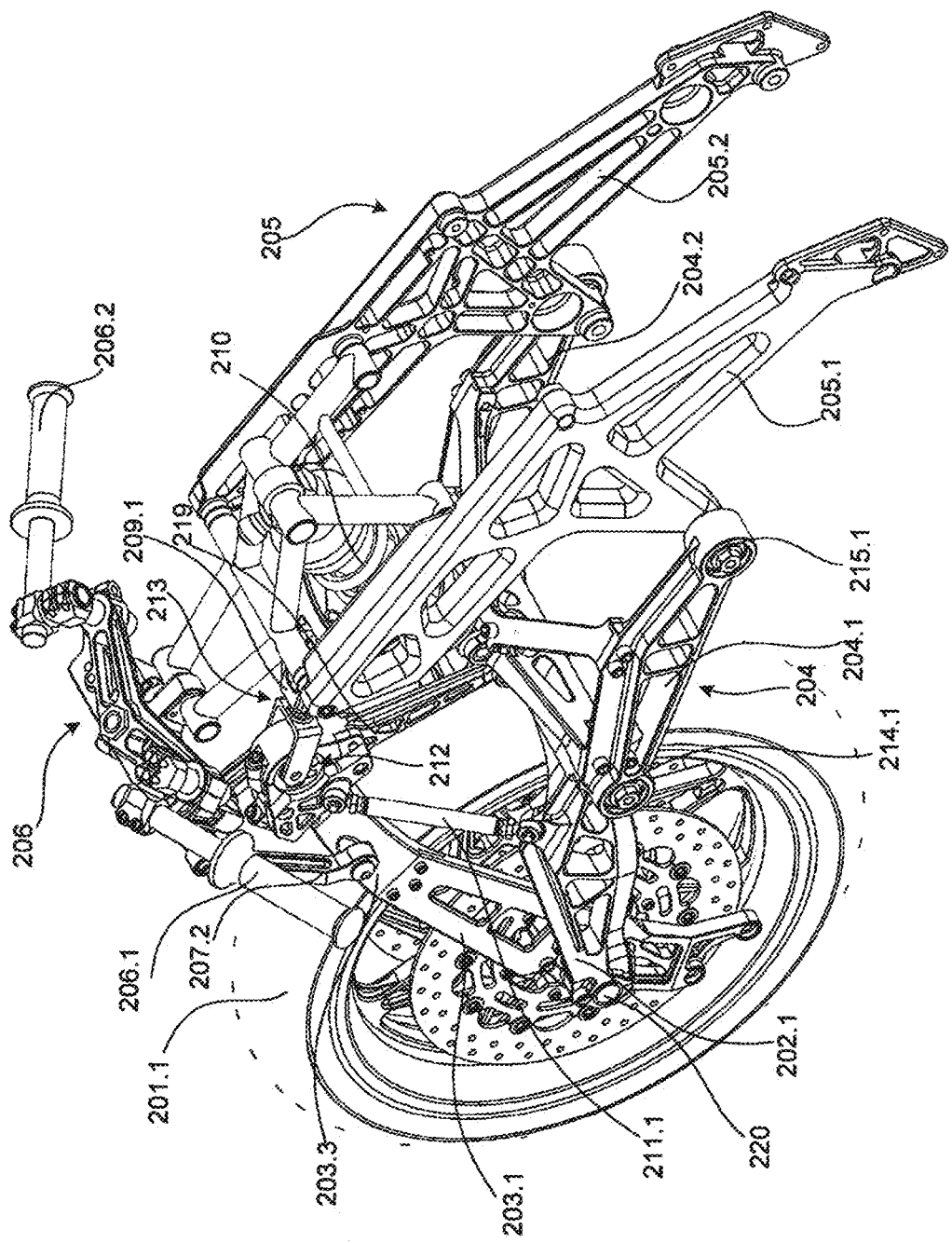
FIG. 2C is a schematic perspective view of a front portion of the vehicle of FIG. 2A.
Figure 2D:
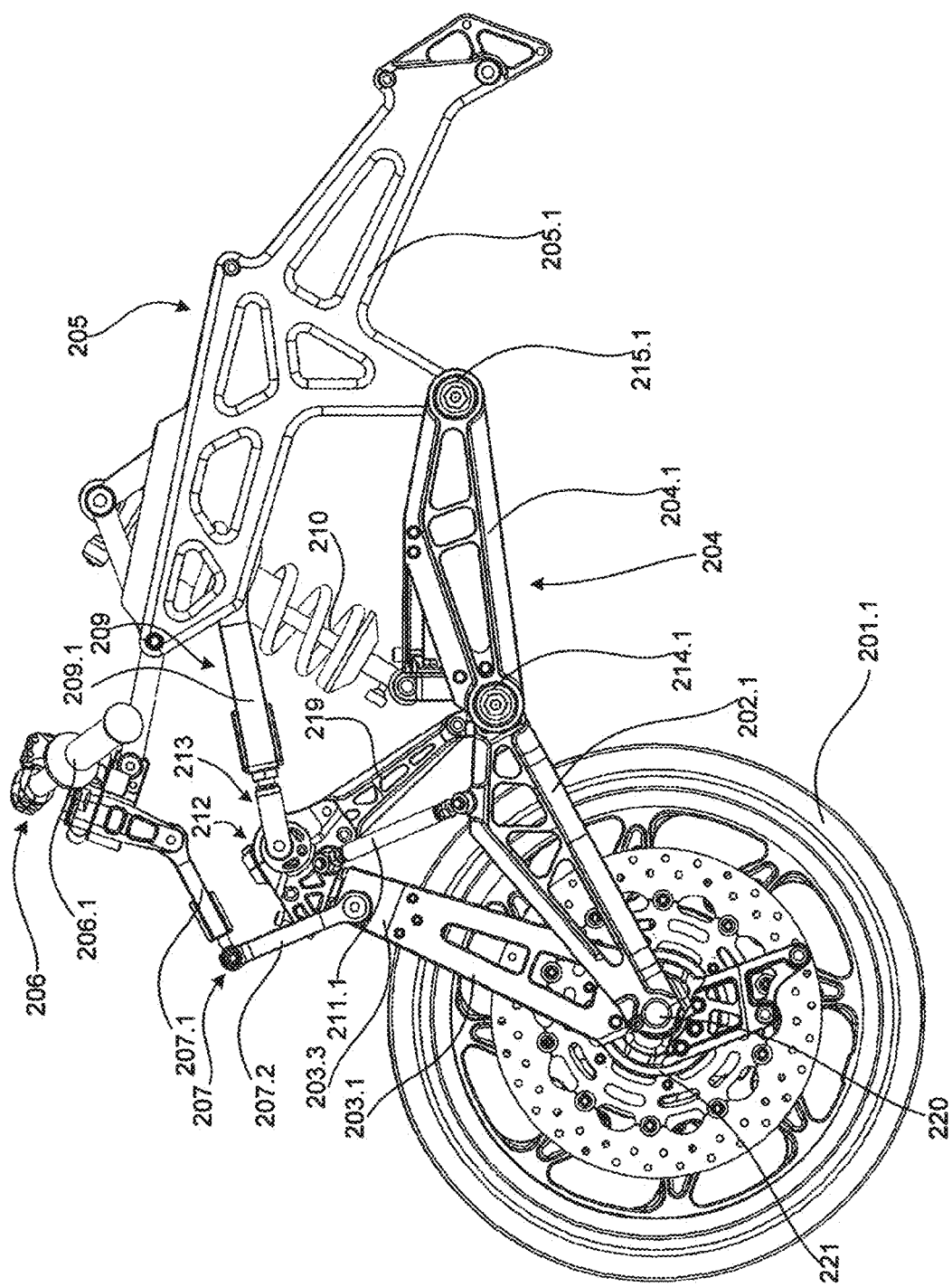
FIG. 2D is a schematic side view of the front portion of the vehicle of FIG. 2A.
Figure 2E:
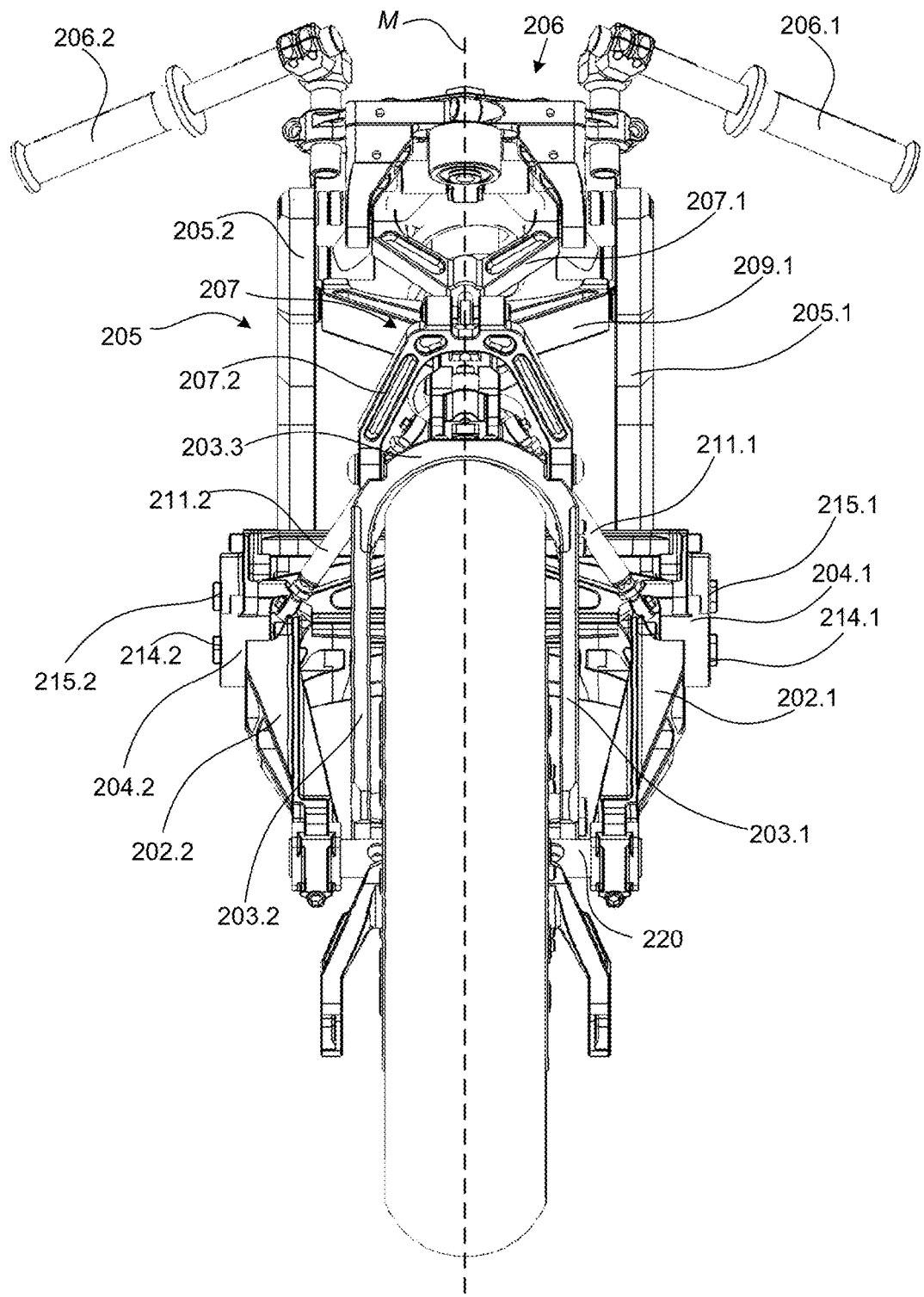
FIG. 2E is a schematic front view of the front portion of the vehicle of FIG. 2A.
Figure 2F:
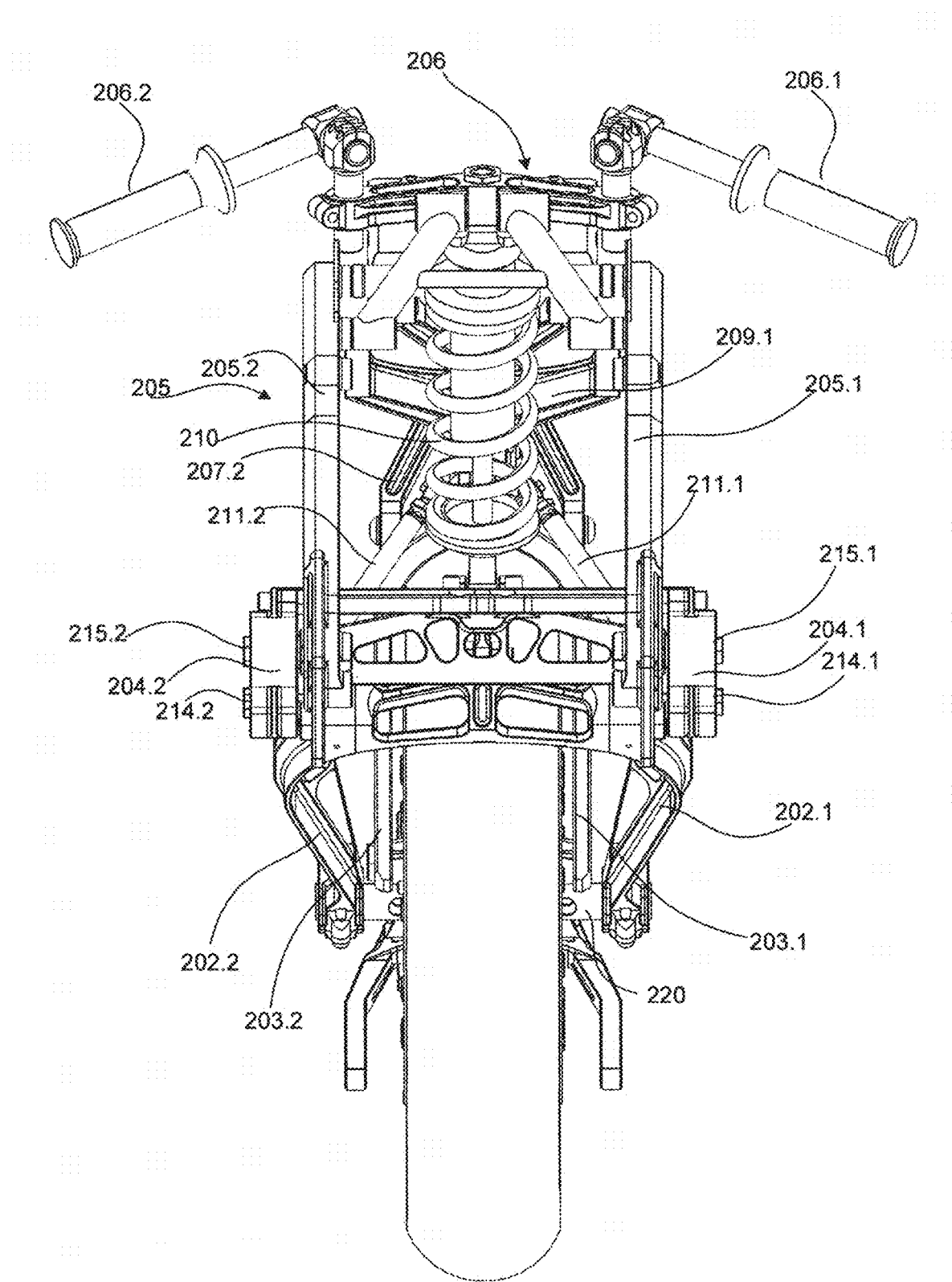
FIG. 2F is a schematic rear view of the front portion of the vehicle of FIG. 2A.
Figure 2G:
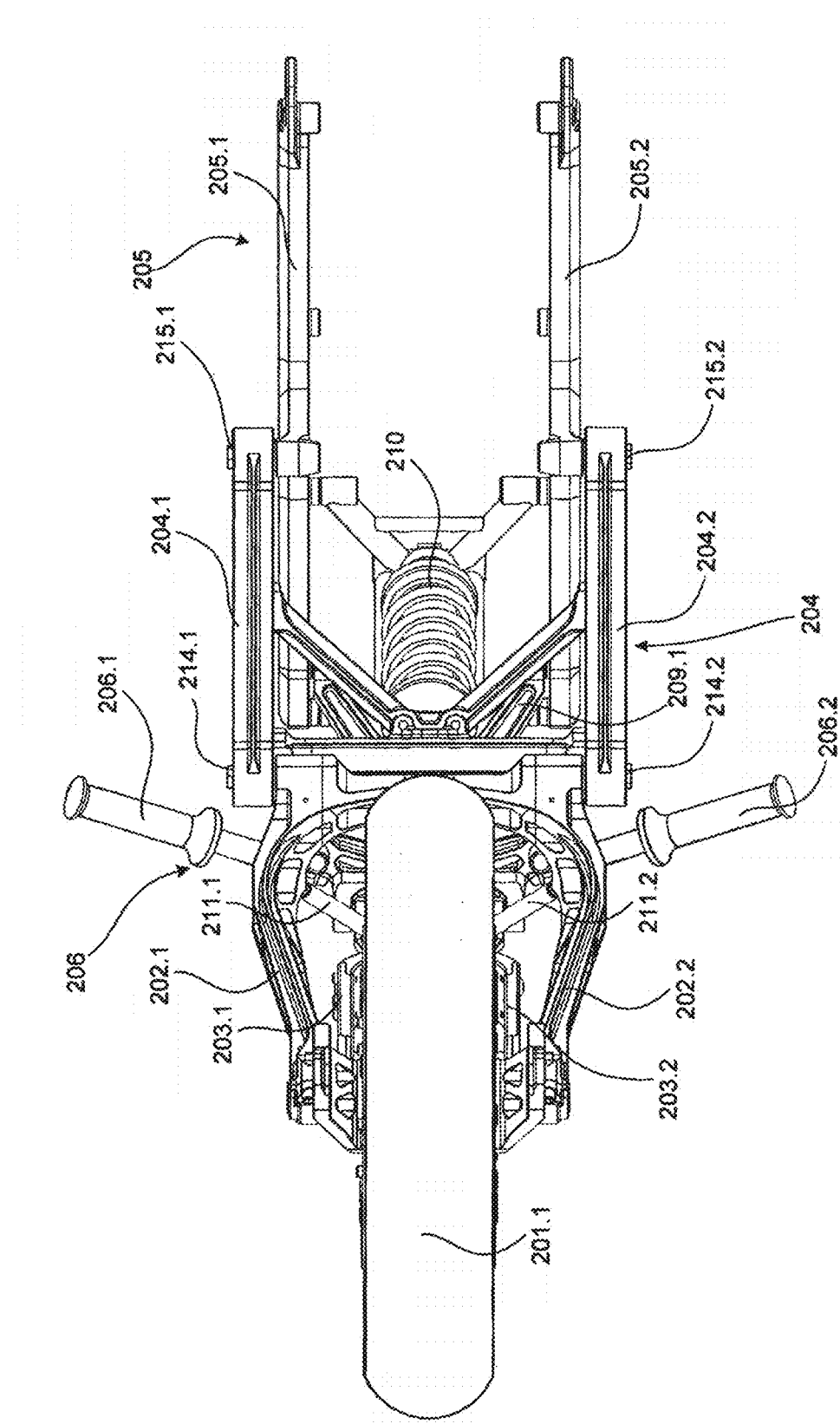
FIG. 2G is a schematic underside view of the front portion of the vehicle of FIG. 2A.
Figure 2H:
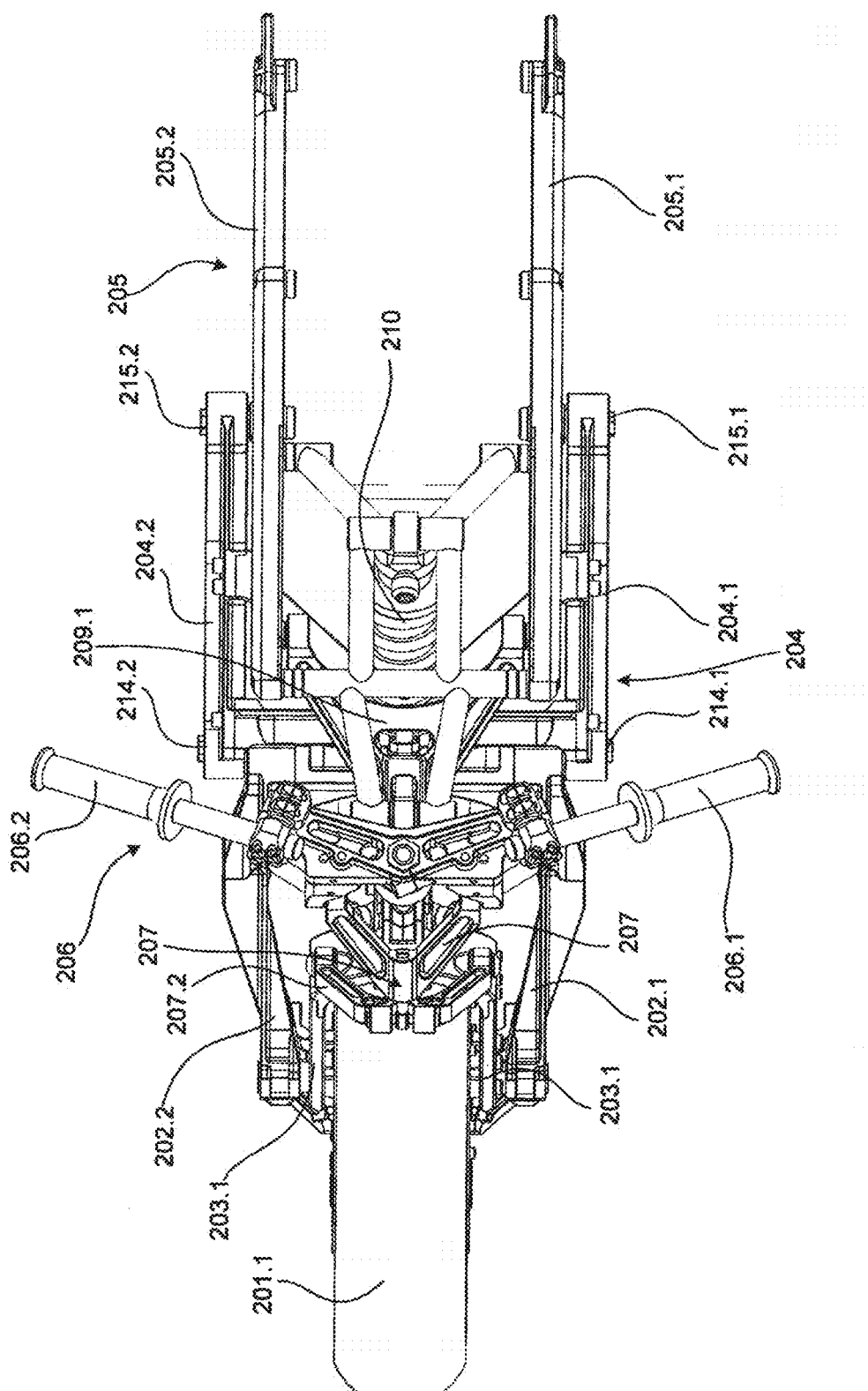
FIG. 2H is a schematic top-down view of the front portion of the vehicle of FIG. 2A.

For the purposes of explanation, reference will be made to orthogonal axes X, Y, Z, shown in FIG. 1, as well as a mid-plane M of the vehicle, as shown in FIG. 2E, which is defined as an X-Y plane coincident with the centre of mass of the vehicle 100. Reference will also be made to a rake angle θ, which corresponds to an angle θ between the steering axis S and the Y axis, and a trail T, which corresponds to a distance between the steering axis S and the wheel 101 at ground level G.

The steering system may be provided with a substantially constant rake angle θ and trail T. This can be useful to provide increased stability, for example, in the event large shock forces or vehicle braking is experienced. However, this feature is not essential, and alternatively the rake angle θ and trail T may be varied between different vehicles, for example, depending on intended use, or alternatively can be adjustable for a given vehicle, as will be discussed further below.

In one example, the wheel support arm 102 pivots relative to the first swing arm assembly 104 about an axis extending perpendicularly relative to the mid-plane of the vehicle. The second swing arm assembly 109 pivots relative to the body 105 about an axis extending perpendicularly relative to the mid-plane of the vehicle. The support member 119 pivots relative to the second end of the first swing arm assembly 104 about an axis extending perpendicularly relative to the mid-plane of the vehicle, and the support member 119 pivots relative to the second end of the second swing arm assembly 109 about an axis extending perpendicularly relative to the mid-plane of the vehicle. Thus, in this example the above mentioned components pivot about an axis parallel to the Z-axis, and hence substantially perpendicular to the mid-plane, however some variation in this regard is possible depending on the particular implementation, and this is not therefore intended to be limiting.

It will be appreciated that the different abovementioned components may be pivotally attached in any appropriate manner, for example using one or more axles, connecting pins, journal bearings, or the like, as will be described in more detail below.

In this example, the steering arms 103 and the wheel hub 121 pivot about the steering axis S which is parallel, and typically coincident with, the mid-plane of the vehicle 100. Again, however, some variation in this regard is possible.

Suspension is provided by allowing the first and second swing arm assemblies 104, 109 to pivot relative to the body 105, in response to loading of the wheel 101 and body 105. This allows the wheel 101 to move relative to the body 105 in the X-Y plane, such that the movement may optionally be absorbed and damped by a shock absorber 110, whilst the steering coupling 107 allows for relative movement between the steering input 106 and the steering arm 103, to accommodate suspension travel, in use.

The shock absorber 110 may be designed to allow pivotal movement of the first and second swing arm assemblies 104, 109 to thereby accommodate relative movement between the wheel 102 and the body in the X-Y plane. This can be achieved in any suitable manner, but typically the shock absorber includes a compressible portion that compresses and expands under the influence of a load. In this regard, the compressible portion may include one or more of a coil, a spring, a leaf spring, a linkage, a telescoping tube, a hydraulic cylinder, a pneumatic cylinder, or the like.

The shock absorber 110 may be coupled to the body 105 and either the first swing arm assembly 104 or the second swing arm assembly 109, and at any suitable position. In the current example, the shock absorber 110 may be coupled to an upper end of the body 105, and proximate to the second end of the first swing arm assembly 104, as shown in FIG. 1.

Additionally, the shock absorber 110 may be arranged in any suitable position relative to the vehicle 100 and/or body 105. In one example, the shock absorber is centrally mounted and parallel to the mid-plane of the vehicle 100. However, this is not essential, and instead the shock absorber 110 may be positioned laterally, offset, or the like, with respect of the mid-plane, and/or operated with one or more suspension links from either of the first and second swing arm assemblies 104, 109. Use of suspension links allows for modification of the position in which the shock absorber 110 is mounted with respect to either of the first and second swing arm assemblies 104, 109, which in use allows a user to alter handling characteristics of the vehicle 100, as desired.

In this example, the arrangement of the first and second swing arm assemblies 104, 109, body 105, form an approximate parallelogram with the triangular arrangement. Dependent on the particular geometry of the parallelogram, this can substantially reduce brake dive, thus ensuring that the shock absorber 110 can not 'bottom out' under extreme braking conditions. In turn, as the shock absorber 110, and thus the suspension, can continue to function to absorb and dampen loads during braking, this also substantially increases steering stability and control compared with traditional arrangements.

However this is not essential, and the shock absorber 110 may be coupled to any suitable portion of the body 105, for example the lower end of the body 105, and similarly to any portion of the first swing arm assembly 104 or the second swing arm assembly 109, or alternatively to any portion of the first swing arm assembly 104 or the second swing arm assembly 109 via one or more suspension links or link arms.

In this example, the increased strength and stability of the arrangement described above means, for example, that the wheel support arm 102 does not require the weight and strength of traditional arrangements. It will be appreciated that this allows the wheel support arm 102 to be thinner and lighter, relative to previous hub centre steering designs, which allows for greater ground clearance of the vehicle 100 while cornering, whilst still maintaining an adequate maximum steering lock angle, namely the angle between the mid-plane of the vehicle 100 and a plane defined by a wheel mid-plane of the wheel 101. In this respect, if a lean angle is defined between the mid-plane of the vehicle 100 and the Y axis, the vehicle 100 is able to corner at a larger lean angle compared with previous hub centre steering arrangements, which can be particularly beneficial in applications such as racing, law enforcement, and the like, where a vehicle 100 is required to achieve a high speeds and a greater lean angle.

In this example, the body 105 includes structural arrangement, such as a chassis. However this feature not essential, and instead the body 105 may include any suitable arrangement including one or more of a chassis, an engine, or the like. For example, the first and second swing arm assemblies 104, 109 may be pivotally mounted to the engine, and in this regard the vehicle 100 may or may not include a chassis 105. Alternatively any one of the first and second swing arms assemblies 104, 109 may be pivotally mounted to the chassis 105 with the other swing arm assembly pivotally mounted to the engine, or vice versa, or any other suitable arrangement, A second example of the vehicle 200 is shown in FIGS. 2A to 2L.

In this example, the vehicle 200 includes a chassis 205, a first swing arm assembly 204, also known as a lower swing arm, two wheel support arms 202.1, 202.2, also known as control arms, an axle 220, and a wheel hub 221 pivotally mounted to the axle 220. The vehicle 200 further includes a second swing arm assembly 209, also known as an upper swing arm, a support member 219, two steering arms 203.1, 203.2, a steering input 206, and a steering coupling 207 for connecting the steering arms 203.1, 203.2 to the steering input 206. In addition, a shock absorber 210 is coupled to the chassis 205 and the first swing arm assembly 204. It will therefore be appreciated that these features are largely similar to those described above with respect to FIG. 1, however further specific features will now be described.

In this example the chassis 205 includes two chassis portions 205.1, 205.2, also known as side frame plates, which are provided lateral and parallel to the mid-plane, and which are coupled together via a plurality of coupling members that are substantially perpendicular to the mid-plane. The coupling members may include any suitable arrangement including cross members, struts, or the like. However, it will be appreciated that this particular arrangement is optional, and in fact the chassis 205 may be provided in any suitable arrangement, including an integrally formed, substantially enclosed, or the like. In addition, the chassis 205 may be composed of any suitable material, including any one or more of aluminium, carbon fibre, titanium, magnesium, chromoly steel, steel, chromium-molybdenum steel, or the like.

In this example, the first and second swing arm assemblies 204, 209 are pivotally coupled to a body, which includes the chassis 205. Additionally or alternatively, the body may include an engine 216, such that the first and second swing arm assemblies 204, 209 are pivotally coupled to the engine 216, and thus the engine 216 is a substantially fully stressed member. In this regard, whilst the remainder of this example refers to the chassis 205, it will be understood that this reference may be interchangeable with the body, or the engine 216, or the like.

The vehicle 200 in this example also includes a brake input, at least one brake, an acceleration input, a seat, a seat mounting, the engine 216, a rear wheel 227, and a rear shock absorber 218, a front tyre, a rear tyre, a muffler.

In one example, the seat mounting 217 and a sprung and dampered rear shock absorber 218 (connected at its upper end to mounts on the chassis 205) are supported by a rear swing arm subframe 225 of the chassis 205 that is affixed between the rear of the side frame plates of the chassis 205. Rear shock. absorber 218 is connected at its lower end to mounts attached to the rear swing arm subframe 225. In addition, the rear swing arm subframe 225 is statically coupled to a rear swing arm assembly 226, which in turn is mounted to a rear axle 228 that supports the rear wheel 227. The rear swing arm assembly 226 is pivotally mounted to either the chassis 205 or the engine 216, such that in use the rear swing arm assembly 226 and rear swing arm subframe 225 pivot on an axis substantially perpendicular to the mid-plane of the vehicle 200 in response to any loads on the rear wheel 227, which are thus absorbed and/or damped by the rear shock absorber 218.

In this example, the rear swing arm subframe 225 and rear swing arm assembly 226 are arranged substantially in a triangle laterally on both sides of the mid-plane of the vehicle 200. In this regard, two rear subframe struts of the rear swing arm subframe 225 are coupled to a rear swing arm of the rear swing arm assembly 226, on each side of the vehicle forming two approximate triangles. This arrangement increases stability and robustness which enables, if desired, the rear swing arm subframe 225 to be thinner and lighter than previous arrangements, which in turn reduces the weight of the vehicle without compromising strength or stability, and thus increases power to weight ratio.

However, it will be appreciated that these features are not essential, and instead a vehicle 200 may include all, none, or any one of these features.

Thus, in this example, the vehicle 200 is a motorbike. However, this is not essential and the vehicle 200 may be of any suitable form and can include any number of wheels 201.1, 201.2 including one, two or more front wheels, and any number of rear wheels. For example, the vehicle 200 may include a car in which two wheels are mounted on respective steering mechanisms. In addition, the vehicle 200 may include a bicycle, a reticulated bicycle or motorbike, a tricycle, a three-wheeled motorbike, a quad bike, a truck, or the like.

Additionally or alternatively, the vehicle 200 may include a fairing, or shell placed at least partially over the outer surface of the vehicle 200. The fairing may be composed of any suitable material, including acrylonitrile butadiene styrene, fibreglass, carbon-fiber-reinforced polymer, metal, or the like. Furthermore, the fairing may include an integral windshield, or may be coupled to a windshield.

In this example, the first swing arm assembly 204 includes laterally spaced first swing arms 204.1, 204.2, which in use are positioned on either side of a mid-plane of the vehicle, and are coupled together via a number of struts, mounted to the first swing arms 204.1, 204.2.

However, it will be appreciated that the two first swing arms 204.1, 204.2 may be coupled together via any suitable arrangement including one or more shafts or axles, or one or more struts in which each strut is either integrally formed with the first swing arms 204.1, 204.2, or mounted to the first swing arms 204.1, 204.2. Alternatively, the first swing arm assembly 204 may include any suitable shaped components, including a substantially 'V'-shaped member, a triangulated 'V'-shaped member, or the like.

The first swing arms 204.1, 204.2 are pivotally mounted about a respective shaft 215 extending outwardly from the chassis 205, via journal bearings 215.1, 215.2 provided at first ends of the first swing arms 204.1, 204.2, to allow pivotal movement of the first swing arms 204.1, 204.2 about the shaft 215. However, any suitable arrangement to allow pivotal movement of the first swing arms 204.1, 204.2 relative to the chassis 205, may be used.

In this example, the second swing arm assembly 209 includes a substantially 'V'-shaped member, also known as a wishbone swing arm 209.1, and an extendable member 213, as described below. However, this feature is not essential and the second swing arm assembly 209 may include any suitable arrangement, including one or more second swing arms. The second swing arm assembly 209 is pivotally mounted about one or more shafts coupled to the chassis 205, inwardly of the chassis 205, via journal bearings (not shown) to allow pivotal movement of the second swing arm assembly 209. However it will be appreciated that any suitable pivotal mounting may be used.

Additionally, in one example the first and/or second swing arm assemblies 204, 209, are pivotally mounted to the chassis 205 via a movable mounting. In this respect, the movable mounting allows the location of a pivot about which the first and/or second swing arm assemblies 204, 209 pivot with respect to the chassis 205, to be modified. In this regard, the movable mounting may include any suitable arrangement including an offset concentric, a sliding plate, a worm gear, or the like. Thus, the movable mounting allows for variations in the rake angle θ, and/or trail T, and/or pro-dive or anti-dive characteristics. However, this feature is not essential.

In addition, in this example the first swing arm assembly 204 and the second swing arm assembly 209 are spaced apart in a direction parallel with the mid-plane of the vehicle 200, and in particular, the first and second swing arm assemblies 204, 209 are also provided about parallel with the ground level G. However, this is not essential, and instead the first and second swing arm assemblies 204, 209 may be provided in any suitable relative orientation.

In the current example, the vehicle 200 includes two wheel support arms 202.1, 202.2 provided on opposing sides of the wheel 201.1 coupled together at first ends. In this example, the wheel support arms 202.1, 202.2 are separately formed and coupled together at first ends via a common axle, which is rotatably supported by journal bearings 214.1, 214.2 provided on the second end of the first swing arm assembly 204. In particular, the wheel support arms 202.1, 202.2 are mounted to the common axle via a non-rotational coupling, for example, one or more bolts, and thus are not pivotally coupled with respect to each other and/or the axle. However, it will be appreciated that this is not essential, and instead the wheel support arms 202.1, 202.2 may be integrally formed, or the like.

In one example, the two wheel support arms 202.1, 202.2 are coupled at a second end to the axle 220, via pinch clamps, bolts or the like, and arcuately curve rearward and upward around the wheel 201.1 at a position to accommodate the wheel's 201.1 steering rotation, and reduce the width of the wheel support arms 202.1, 202.2, also known as the control arms, to their minimal. Alternatively, the axle 220 may be pivotally mounted to the wheel support arms 202.1, 202.2, for example using rotational bearings or axial bearings, or the like, such that the pivotal mounting is typically maintained substantially static during operation of the vehicle 200, for example using a locking mechanism, and able to pivot during adjustment of the rake angle θ, and/or trail T, and/or pro-dive or anti-dive characteristics, and this will be discussed further below.

Optionally, the two wheel support arms 202.1, 202.2 may be also sufficiently arcuate to accommodate full turning motion of the wheel 201.1 in its entire steering range of rotation, whilst still being of a minimal width to allow for a greater lean angle which is beneficial in some applications.

In this example, the two steering arms 203.1, 203.2 are coupled together at the first ends with 'U'-shaped plate 203.3 via a number of suitable bolts, for example key bolts, or the like. However, it will be appreciated that this is not essential, and instead the steering arms 203.1, 203.2 may be integrally formed, or may be coupled via a common axle, one or more struts or shafts, or the like.

Additionally, the two steering arms 203.1, 203.2 are pivotally coupled to the support arm 219, and in one example are journaled to the support member 219 via a bearinged pin at a steering arm pivot. This allows the steering arms 203.1, 203.2 to pivot relative to the support arm 219 and the axle 220, about the steering axis. Alternatively, any pivotal coupling may be used, including a shaft and journal bearing, axle, or the like.

The support arm 219 is also coupled to the wheel support arms 202.1, 202.2 via any suitable coupling, including lugs, bolts, or the like.

In this example, the steering coupling of the vehicle 200 includes two shear links 207.1, 207.2. In this respect, the upper shear link 207.1 is coupled to the steering input 206, in the form of handlebars 206.1, 206.2 which pivot relative to the chassis 205, whilst the lower shear link is coupled to the steering arms. The upper shear link 207.1 is pivotally coupled to the lower shear link 207.2 at a shear pivot, to allow the upper and lower shear links 207.1, 207.2 to pivot with more than one degree of freedom, such as a rose joint. This allows the steering coupling 207 to compress and/or expand as well as translate torque from the steering input 206 to the steering arms 203.1, 203.2.

The upper shear link 207.1 is coupled to the handle bars 206.1, 206.2 via rotational or pivotal bearings. The lower shear link 207.2 is connected to the first end of the steering arms 203.1. 203,2 via rotational or pivotal bearings.

The benefits of this arrangement include that the steering coupling 207 is able to absorb any non-steering loads on the wheel instead of transferring them to the steering input 206, thus improving handling and stability by separating suspension from steering. However, it will be appreciated that this feature is not essential, and in this regard the shear pivot may include only a single degree of freedom, such that only steering torque is at least partially transferred. Furthermore, the steering coupling 207 may instead include any number of shear links, including one or more.

Additionally or alternatively, the steering coupling 207 may include one or more telescoping tubes. In this regard, the telescoping tube would include an arrangement for transferring torque from the steering input 206 to the steering arms 203.1, 203.2, for example including a steering yoke, spline, key, or the like, or including one or two telescoping tubes which pivot about the steering axis. In a further example, the steering coupling 207 may include one or more push rods and/or one or more cables and/or an electronic input device (for example, using fly-by-wire technology).

In this example, the steering arms 203.1, 203.2 and the wheel hub 221 pivot about a first steering axis parallel with a mid-plane of the vehicle, and the steering input 206 pivots relative to the chassis 205 about a second steering axis parallel with the mid-plane. As shown in FIGS. 2A to 2H, the first and second steering axes appear co-axial, however this is not essential. In particular, modifications using the adjustment coupling 212 and/or extendable member 213 may modify the orientation of the first steering axis, and thus the first and second steering axis may no longer be co-axial, as will be described in more detail below. However, these features are not essential, and in any event it will be appreciated that the first and second steering axes may be one or more of co-axial, parallel, or not co-axial and not parallel.

Figure 2I:
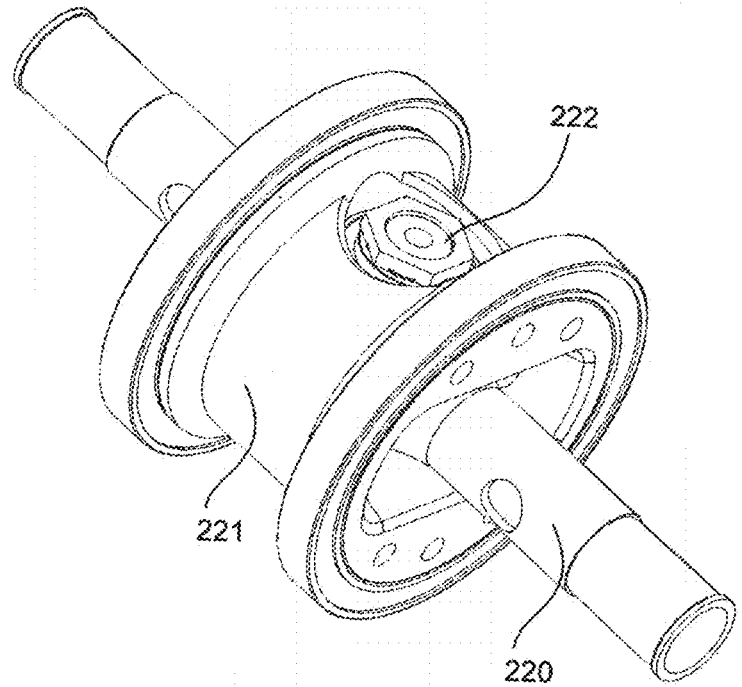
FIG. 2I is a schematic perspective view of the axle and wheel hub of the vehicle of FIG. 2A.
Figure 2J:
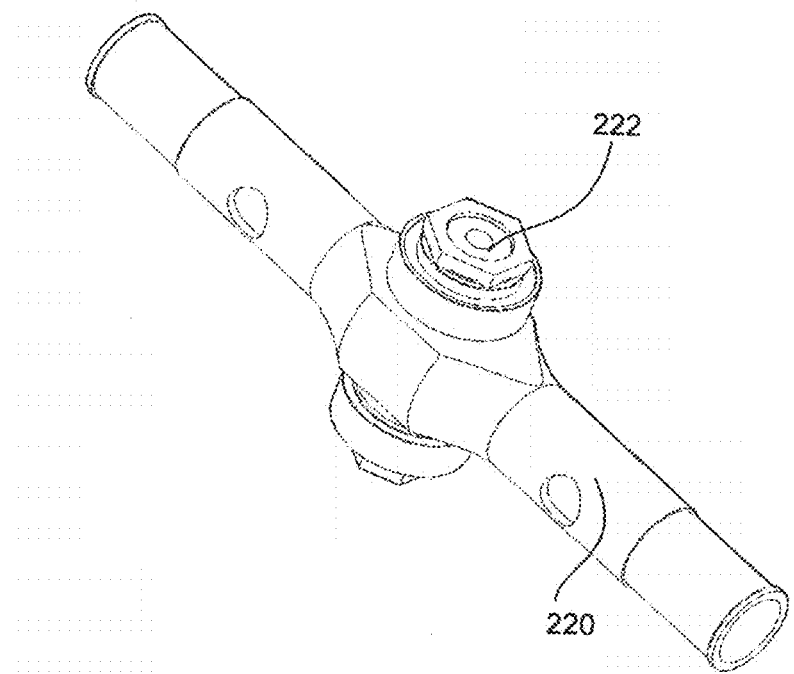
FIG. 2J is a schematic perspective view of the axle of FIG. 2I.
Figure 2K:
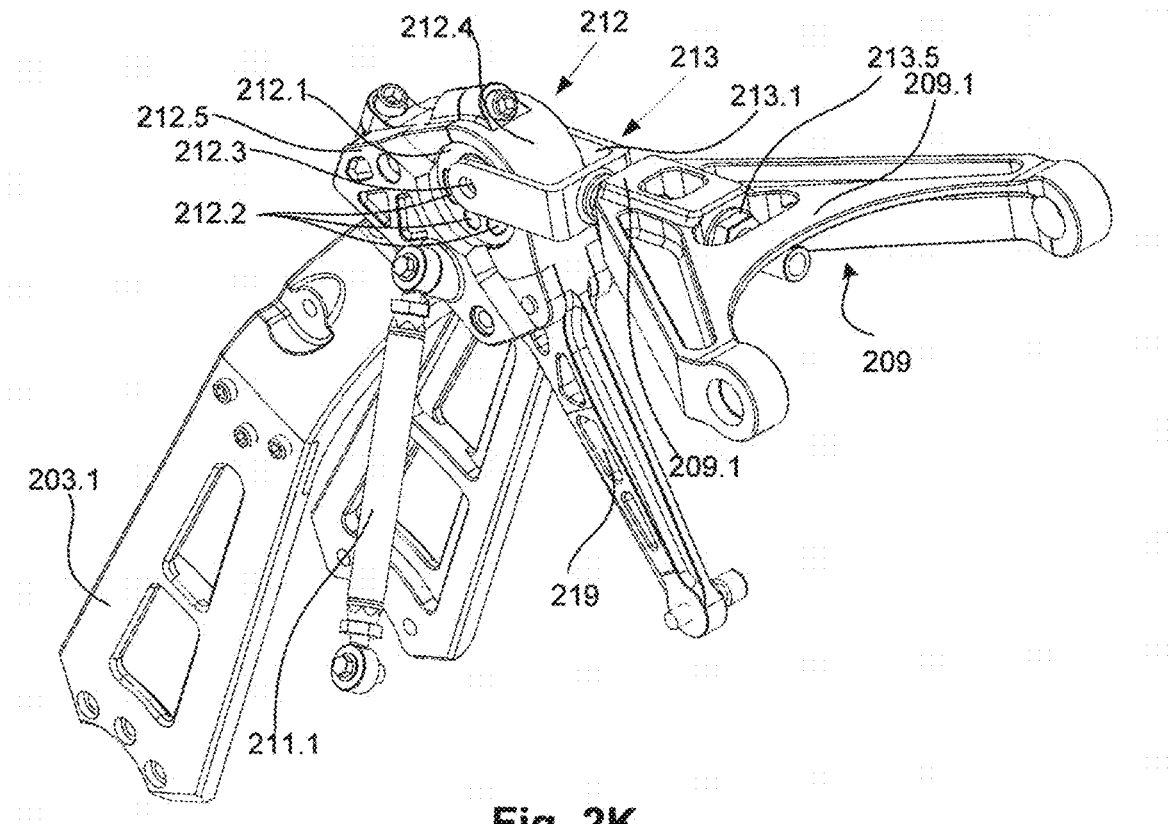
FIG. 2K is a schematic perspective view of the wheel support arms, support struts, support member, second swing arm assembly, adjustable coupling, and extendable member of the vehicle of FIG. 2A.
Figure 2L:
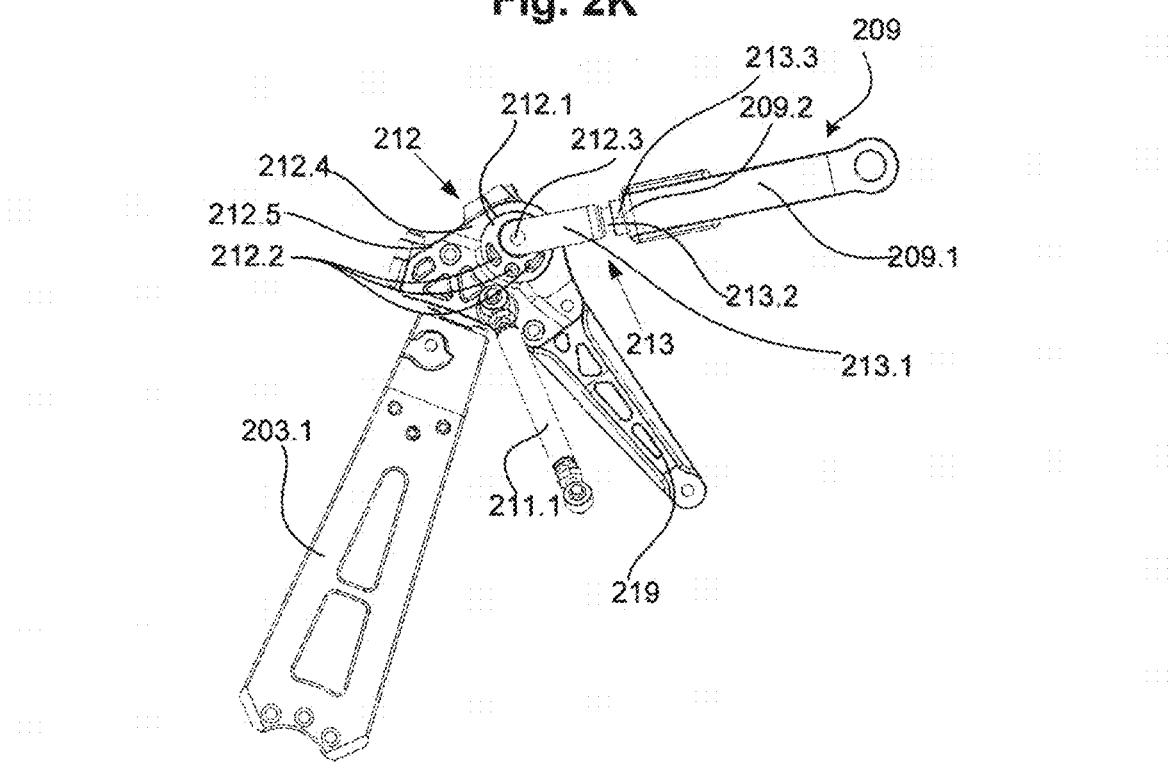
FIG. 2L is a schematic side view of the wheel support arms, the support struts, the support member, the second swing arm assembly, the adjustable coupling, and the extendable member of the vehicle of FIG. 2A.

In this example, the vehicle 200 includes a wheel hub 221 pivotally mounted to a shaft 222 extending from the axle 220, as shown in FIGS. 2I and 2J. Typically, the shaft 222 is known as a king pin. In some cases, it may be desirable to offset the rake angle θ, and/or trail T, and in order to achieve this, the shaft 222 and wheel hub 221 may be offset from the axle 220 via any suitable arrangement, including one or more lugs mounted to the axle, or the like.

In this regard, the vehicle 200 includes hub centre steering. It will be appreciated that this arrangement allows a separation of vehicle 200 steering from suspension, which has the advantage of transferring shock load forces substantially parallel to the mid-plane which are incident on the wheel 201.1 via the wheel support arms 202.1, 202.2 to the shock absorber 210. Thus, any shock loads are transferred from the wheel 201.1 in a shorter path to the centre of gravity of the vehicle, via the first and second swing arm assemblies 204, 209, which is in contrast to traditional arrangements. Thus, any incident shock load forces are at least partially or substantially isolated from the vehicle steering, including the steering arms 203.1, 203.1, the steering coupling 207, and the steering input 206, and thus these components do not have to be composed of unnecessarily heavy or robust materials which can add unnecessary weight to the vehicle 200. Furthermore, the isolation of vehicle steering and suspension increases the efficiency in the function of both, for example changes in one do not influence the other.

In this regard, the upper and lower swing arms 209, 204 allow the triangulated structure of wheel hub 221, control arms 202.1, 202.2, steering arms 203.1, 203.2, support struts 211.1, 211.2, and support arm 219 to remain at an almost constant rake and trail geometry as the swing arm assemblies 204, 209 arcuately rotate in an upward moment through the suspension travel system of the shock absorber 210 to accommodate bump travel from the wheel 201.1 and disperse dive or anti-dive forces from the central mass of the vehicle 200.

In this example, the steering input 206 includes two handle bars 206.1, 206.2, in which both handle bars are coupled in order to pivot relative to the chassis 205 at a pivotal steering connection. In this regard, the pivotal steering connection includes a shaft mounted to the chassis 205, about which the handle bars 206.1, 206.2 pivot via a journal bearing or axial rotational bearing. However, it will be appreciated that this feature is not essential, and the steering input 206 may be pivotally coupled to the chassis 205 in any suitable manner. Additionally or alternatively the steering input 206 may include any suitably arrangement including one or more handle bars, a steering wheel, a joystick, or the like.

In this example, the support member 219 and the second end of the second swing arm assembly 209 are pivotally mounted via an adjustable coupling 212. The adjustable coupling 212 allows a user to modify a relative position of a pivotal connection 212.3 between the second end of the second swing arm assembly 209 and the support member 219. In one example, shown in FIGS. 2K and 2L, the adjustable coupling 212 includes a rotatable disc 212.1, sometimes known as a concentric, including the pivotal connection 212.3 offset from a centre of the rotatable disc 212.1. Rotation of the rotatable disc 212.1 allows the position of the pivotal connection 212.3 to be adjusted, and in addition a locking member allows the rotatable disc 212.1 to be retained in place until further adjustment is required, if any. Additionally, the concentric 212.1 may be housed in a housing 212.4, also known as a concentric housing 212.4. which houses and may protect the concentric 212.1, and any locking members. Optionally, a lower housing 212.5 may also be provided to house a lower portion of the concentric 212.1, and in this regard the housing 212.4 and lower housing 212.5 may be separately or integrally formed. However this feature is not essential.

However, it will be appreciated that any suitable adjustable coupling 212 may be used. In another example, the adjustment coupling 212 includes a plurality of apertures 212.2 in a non-rotatable disc, and the second swing arm assembly 209 includes a pivotal attachment member, such that the pivotal attachment member may be coupled to any one of the plurality of apertures 212.2, thus allowing a user to modify a relative position of a pivotal connection 212.3 between the second end of the second swing arm assembly 209 and the support member 219. However, the plurality of apertures 212.2 is not an essential feature, and they may not be provided, or instead may be merely provided in order to reduce the weight of the vehicle 200.

Figure 2M:
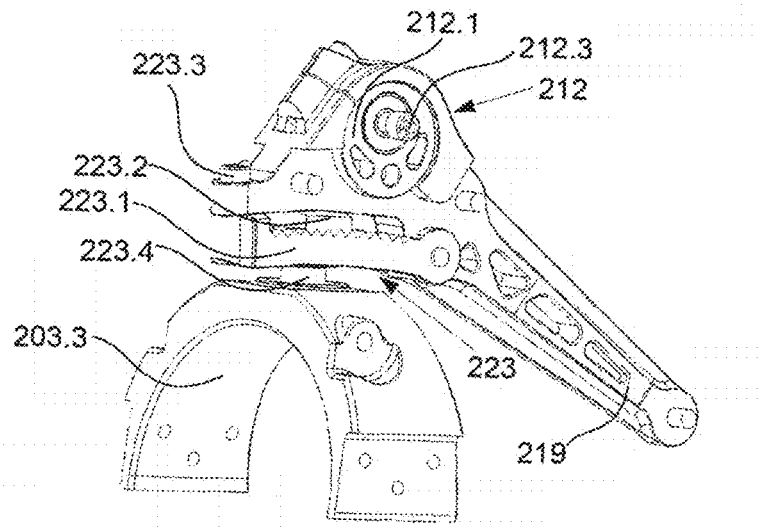
FIG. 2M is a schematic perspective view of an adjustable member, the support arm, and the adjustable coupling of the vehicle of FIG. 2A.
Figure 2N:
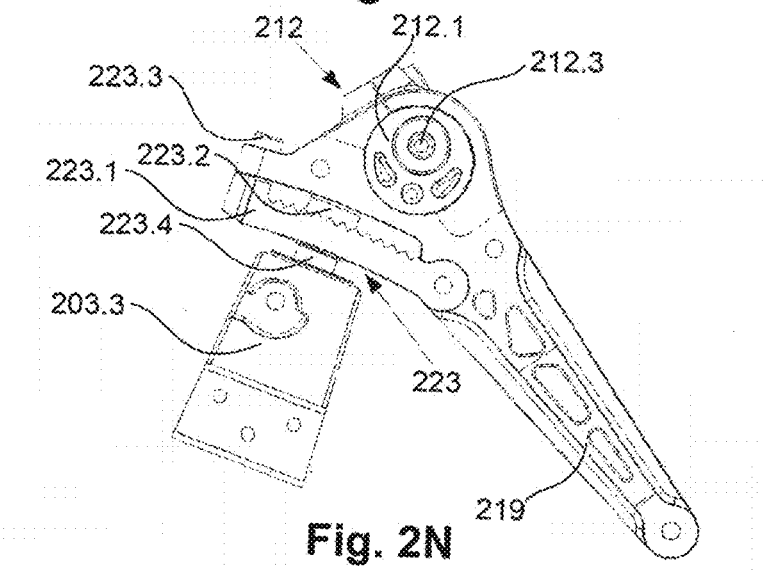
FIG. 2N is a schematic side view of the adjustable member, the support arm, and the adjustable coupling of the vehicle of FIG. 2A.
Figure 2O:
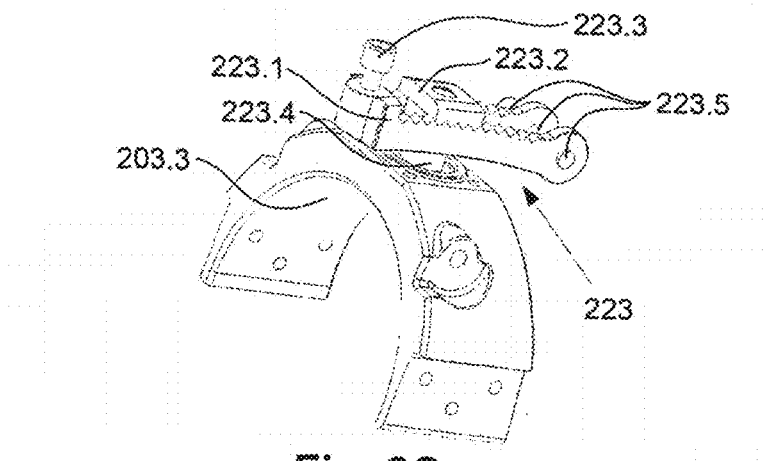
FIG. 2O is a schematic perspective view of the adjustable member of the vehicle of FIG. 2A.
Figure 3A:
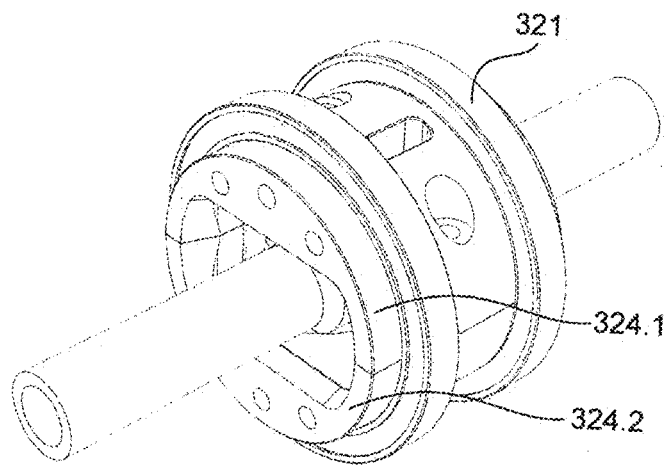
FIG. 3A is a schematic perspective view of a further example of an axle and wheel hub for use in a vehicle.
Figure 3B:
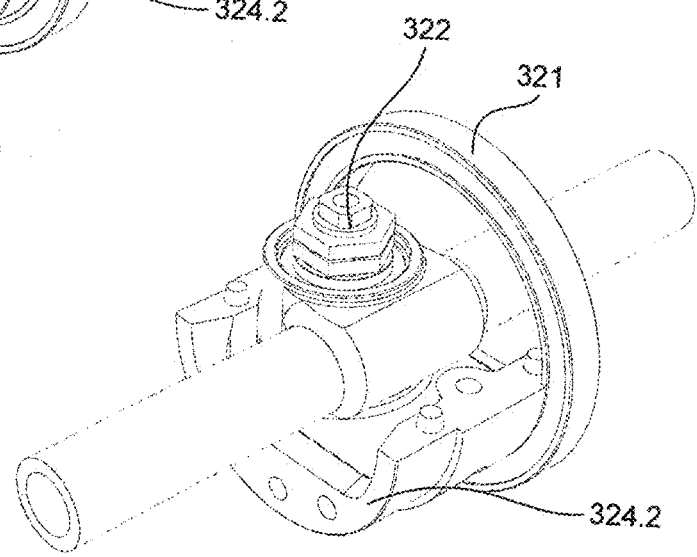
FIG. 3B is a schematic perspective partially cutaway view of the axle and wheel hub of FIG. 3A.
Figure 3C:
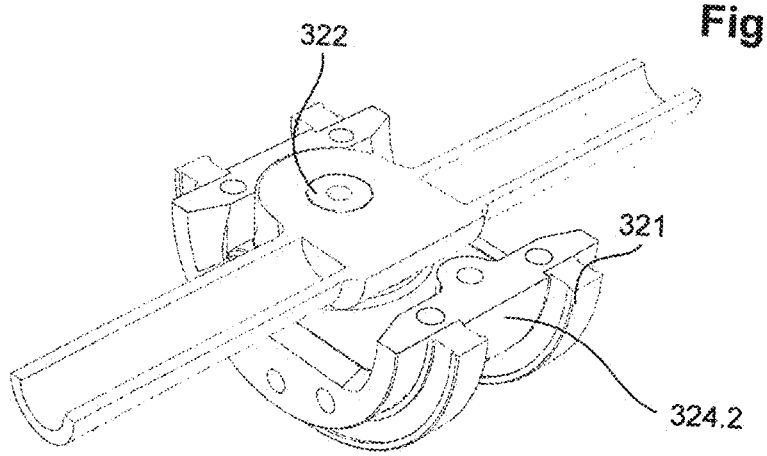
FIG. 3C is a schematic perspective partially cutaway view of the axle and wheel hub of FIG. 3A.
Figure 3D:
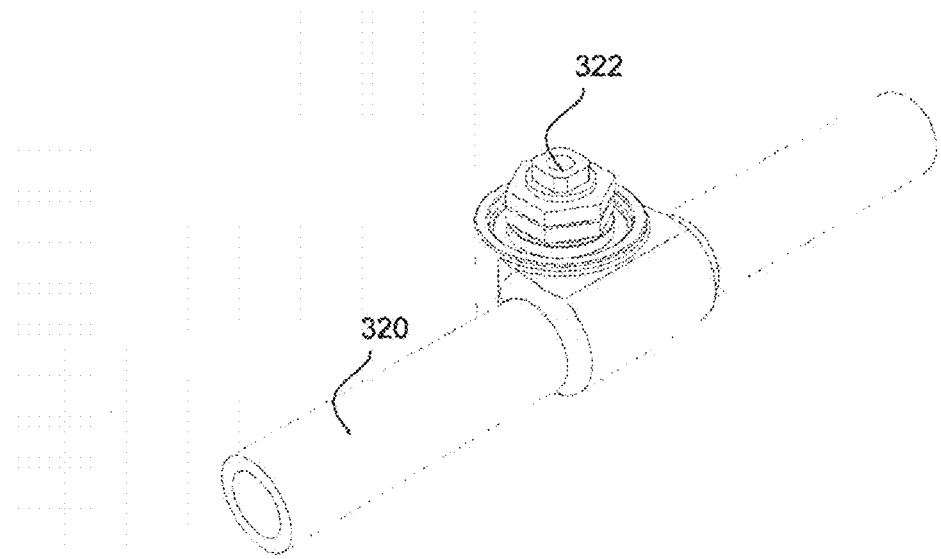
FIG. 3D is a schematic perspective view of the axle of FIG. 3A.
Figure 3E:
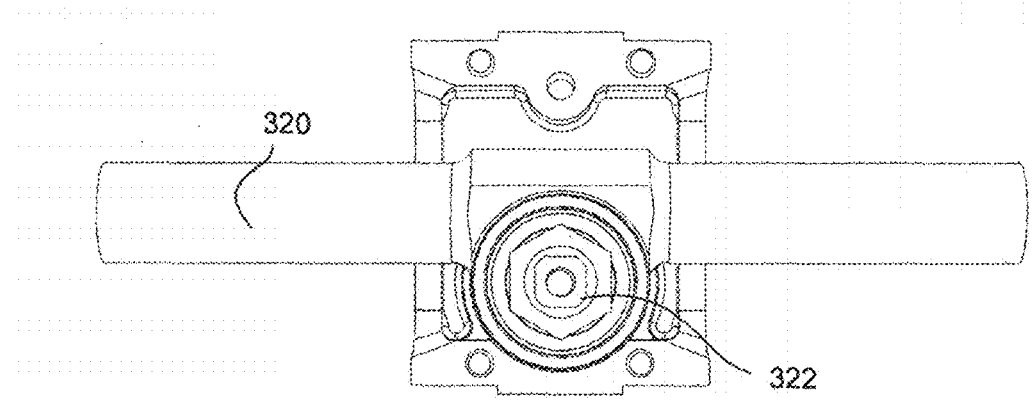
FIG. 3E is a schematic plan partially cutaway view of the axle and wheel hub of FIG. 3A.
Figure 3F:
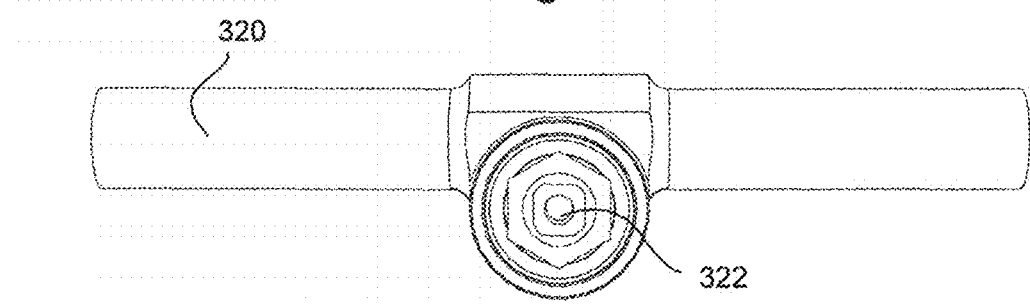
FIG. 3F is a schematic plan view of the axle of FIG. 3A.

Additionally or alternatively, the steering arms 203.1, 203.2, and thus the hub centre unit and axle 220, are coupled to the support arm 219 via an adjustable member 223, for example as shown in FIGS. 2M to 2O. In this respect, the coupling between the steering arms 203.1, 203.2 and the support arm 219, which in this example includes the adjustable coupling 223, must accommodate the braking force of the vehicle 200, and thus must be sufficiently robust. The adjustable member 223 allows the position of the steering arm pivot to be modified, in order to allow a user to modify the orientation of the steering axis S, and thus the rake angle θ, and/or trail T, and/or pro-dive or anti-dive characteristics. The adjustable member may include any suitable arrangement, including an adjustable sliding plate, and axial pivot plate, clamped plates, or the like.

In this example, as shown in FIGS. 2M to 2O in which the lower housing 212.5 has been hidden for ease of reference, the adjustable member 223 includes an adjustable sliding plate 223.1 which is typically housed in the lower housing 212.5 of the concentric 212.1. The adjustable sliding plate 223.1 is statically coupled to the support member 219 via any suitable coupling or couplings, including one or more of an adjustment bolt 223.5, a bolt 223.3 or the like. The adjustable sliding plate 223.1 includes a plurality of teeth for engaging a complementary engagement member 223.2. However, the plurality of teeth are not essential, and any other suitable arrangement may be used, for example flat or arcuate clamping plates, or the like.

Additionally, a bearing is coupled to the steering arms 203.1, 203.2, and in this example the 'U' shaped plate 203.3, via any suitable coupling, for example a circlip, and pivotally coupled to a shaft 223.4, which terminates in the engagement member 223.2. In use, the engagement member 223.2 is engaged with the adjustable sliding plate 223.1, such that the steering arms 203.1, 203.2 are pivotally coupled to the adjustable sliding plate 223.2, and hence the support member 219. In this respect, the steering arms 203.1, 203.2 pivot relative to the support arm 219 about the steering axis S.

In this regard, a user may modify the orientation of the steering axis S parallel to the mid-plane of the wheel 201.1 of the vehicle 200 by pivoting the steering arms 203.1, 203.2, and thus the adjustable sliding plate, about an axis substantially defined by the axle 220. This can be achieved, for example, by loosening or removing the adjustment bolt 223.3, unengaging the plurality of teeth of the adjustable sliding plate 223.1 and the engagement member 223.2, sliding the adjustable sliding plate 223.1 to the desired position about an axis substantially defined by the axle 220, for example by pivoting the steering arms 203.1, 203.2, engaging the plurality of teeth of the adjustable sliding plate 223.1 and the engagement member 223.2, and replacing the adjustment bolt 223.3. Optionally, the axle 220 may be pivoted relative to the wheel support arms 202.1, 202.2, while the adjustable sliding plate 223.1 is moved to the desired position, and this may be achieved in any suitable manner, such as described above.

However, this is not essential, and in other arrangements the adjustable member 223 may allow the steering arm pivot to be modified in any direction, and using any suitable arrangement. For example, the adjustable member 223 may include one or more worm gears, thus allowing adjustment of the steering axis S using the adjustable member 223 to be automated or semi-automated, and this will be discussed further below.

In this regard, the concentric 212.1 in its housing 212.4 can be rotated around its axis to contribute to changes in suspension and rake geometry, or rake angle θ and/or trail T and/or pro- or anti-dive. Additionally the steering arms 203.1, 203.2 can be pivoted on the wheel's 201.1 rotational axis, forwards or backwards, within the concentric housing 212.4 on the adjustable sliding plate to allow for changes to the steering axis rake, or rake angle θ, and trail T.

Additionally or alternatively, a length of the second swing arm assembly 209 can be adjusted. In one example, shown in FIGS. 2K and 2L, this is achieved by providing an extendable member 213 for allowing a user to modify a length of the second swing arm assembly 209. In this example, the extendable member 213 includes a 'C'-shaped bracket 213.1, also known as an adjustable screw arm or 'U' shaped grab plate, provided on a threaded rod 213.2, including one or more complementary nuts 213.3, 213.5, also known as lock nuts, and coupled to an apex 209.2 of a V-shaped body 209.1. Thus, the V-shaped body 209.1 forms the first end of the second swing arm assembly 209, and the extendable member 213 forms the second end of the second swing arm assembly 209. Adjusting the relative position of the nuts 213.3, 213.5 along the rod 213.2 adjusts the relative position of the 'C'-shaped bracket 213.1 in the second swing arm assembly 209, and thus modifies the length of the second swing arm assembly 209. However, it will be appreciated that any suitable form of extendable member 213 could be provided. For example, the extendable member 213 may include a ratchet and pawl, of the like. It will further be appreciated that this feature is not essential.

The adjustable coupling 212 and/or the extendable member 213 and/or adjustable member allow the user to modify the rake angle θ and/or trail T. It will be appreciated that such modifications alter geometrical characteristics of the vehicle 200 and this may be highly beneficial, for example, in order to suit different users' preferences, different riding conditions, and the like. Furthermore, these components do not compromise the shock absorber's 210 ability to perform its function of absorbing bump force anomalies from road.

These modifications may be performed manually, or may be semi-automated or fully-automated. In one example the modifications may be automatically performed based on changes in the vehicle's 200 orientation, acceleration and/or deceleration, or the like. In this regard, sensors may be coupled to an electronic processing device, such as a processing system, which is adapted to monitor signals from the one or more sensors and, generate at least in part using the signals an output to actuate one or more actuators. Accordingly, the sensors could include one or more gyroscopes to monitor orientation, a global positioning systems (GPS) to monitor location and optionally, for example, associated terrain, one or more accelerometers to monitor acceleration and deceleration, and the like. Similarly, actuators may include any suitable mechanism to modify the steering axis S, the rake angle θ and/or trail T and/or pro-dive or anti-dive characteristics, for example, by actuating the adjustable coupling and/or extendable member.

In one example, the processing system is adapted to receive signals from the sensors, and then interpret at least part of the signals and actuate an appropriate actuator or actuators. Accordingly, the processing system can include any suitable form of electronic processing system or device that is capable of receiving and interpreting signals from the one or more sensors.

In one example, the processing system includes a processor, a memory, an input/output (I/O) device, and an external interface coupled together via a bus. The external interface is used for coupling the processing system to peripheral devices, such the one or more sensors, the one or more actuators, as well as to devices, such as fuel gauges, speedometers, the engine, global positioning systems (GPS), anti-lock brakes, other databases, other communications networks, or the like. It will also be appreciated that additional hardware components, may be incorporated into the processing system, depending on the particular implementation.

In use, the processor executes instructions in the form of applications software stored in the memory to allow signals from the sensors to be interpreted and used, for example to actuator the actuators. Accordingly, for the purposes of the following description, it will be appreciated that actions performed by the processing system are typically performed by the processor under control of instructions stored in the memory, and this will not therefore be described in further detail below.

Accordingly, it will be appreciated that the processing system may be formed from any suitably programmed processing system, such as an engine control unit (ECU), on-board vehicle computer, or other electronic control unit. Accordingly, the processor can be any form of electronic processing device such as a microprocessor, microchip processor, logic gate configuration, firmware optionally associated with implementing logic such as an FPGA (Field Programmable Gate Array), an EPROM (Erasable Programmable Read Only Memory), or any other electronic device, system or arrangement capable of interacting with the one or more sensors and optionally the output.

However, this feature is not essential, and alternatively the modifications to the steering axis S, the rake angle θ and/or the trail T, and/or pro-dive or anti-dive characteristics may be performed by user selection such that user input received by the processing system is interpreted, and the processing system subsequently actuates the appropriate actuator or actuators, and/or by manually manipulating the adjustable coupling 212 and/or the extendable member 213, or the like.

Furthermore, when a vehicle 200 brakes, the vehicle 200 may undergo a load transfer, in which the load on the wheel 201.1 changes. Depending on the configuration of the vehicle 200, this can result in movement of a front end of the vehicle, where the front end includes at least part of the chassis 205. In this regard, if the front end of the vehicle moves in a direction substantially towards the ground level G, this is typically known as dive or pro-dive. In contrast, if the front end of the vehicle moves substantially away from the ground level G, this is typically known as anti-dive. In one example, the adjustable coupling 212 and/or the extendable member 213 and/or adjustable member allow the user to modify a degree of dive or anti-dive.

In this example, the vehicle 200 also includes two support struts 211.1, 211.2 coupled to the support member 219 and the wheel support arms 202.1, 202.2. In this regard, the support struts 211.1, 211.2 provide additional structural support to the vehicle 200, which can allow, for example, the wheel support arms 202.1, 202.2 to be thinner than previous hub centre steering arrangements. The support struts 211.1, 211.2 are attached to about a mid point on the wheel support arms 202.1, 202.2, however this particular placement is not necessary and instead the support struts 211.1, 211.2 may be mounted at any suitable position on the wheel support arms 202.1, 202.2. It will be appreciated that the support struts 211.1, 211.2 may include any suitable arrangement including being integrally formed with the support member 219, or wheel support arms 202.1, 202.2, or alternatively may be coupled thereto.

Additionally, the support struts 211.1, 211.2 may be composed of any suitable material, and in some examples may include some compliance to enable lateral movement, and this will be discussed further below. However, this feature is option, and alternatively the vehicle 200 may include no struts, or more than two struts.

The connection of concentric housing 212.4, steering arms 203.1, 203.2, control arms 202.1, 202.2, support struts 211.1, 211.2, the support arm 209, and centre-hub unit, including wheel hub 221, combine to form a light weight, fully triangulated, highly adjustable, incredibly strong and stable structural unit.

In one example, the vehicle 200 includes one or more aerodynamic elements, such as winglets, aerilons, or the like, mounted to one or more of the body, chassis 205, upper and/or lower swing arm assemblies 204, 209, wheel support arms 202.1, 202.2, or the like. In this regard, the aerodynamic elements are positioned such that in use, they at least partially contribute to a net downward force, namely a force substantially perpendicular and towards the group plane G, thus helping the wheel 201.1 maintain contact with the ground plane G.

In a further arrangement, the aerodynamic elements are adjustable. For example, during cornering, the mid-plane of the vehicle 200 will not typically remain perpendicular to the ground plane G. However, it is preferable that the aerodynamic elements maintain the net downward force substantially perpendicular to the ground plane G, and not parallel to the mid-plane of the vehicle 200, in order to remain effective through a corner.

Therefore, in one example the aerodynamic elements include one or more automatically, semi-automatically, or manually adjustable winglets or aerilons which pivot relative to the mid-plane of the vehicle 200 whilst substantially maintaining a similar alignment in respect of the ground plane G. Thus the winglets or aerilons may be provided substantially parallel to the ground plane G, and pivotally mounted to the vehicle 200 via controllable hinges, or the like. In addition, the adjustability of the aerodynamic elements may be controlled in any suitable manner, such as described above. However, this feature is not essential.

In some arrangements, it may be desirable to have some lateral movement of the vehicle 200 in use. For example, some horizontal flex encountered by the wheel 201.1 during cornering increases the suspension as lateral movement in the wheel 201.1 is able to accommodate road anomalies, or other loads which are incident on the cornering wheel 201.1, thus increasing stability. The stability of the triangular arrangement of the above-described examples means that increasing a lateral compliance of one or more of the components will not lead to unstable handling. Thus, one or more of the chassis 205, support struts 211.1, 211.2, and the like may include horizontal flex, for example, by being composed of a semi-rigid or semi-flexible material or components, or by the inclusion of compliant joints, couplings or the like.

In one example, the compliance is substantially in the Z-plane in order to accommodate road anomalies without distortion to the inline stability of the front and rear wheels. This can be achieved through pre-determined compliance in any one or more of the wheel support arms 202.1, 202.2, first and second swing arm assemblies 204, 209, steering arms 203.1, 203.2, or the like. However, this feature is not essential.

A further example of an axle and wheel hub is shown in FIGS. 3A to 3F.

In this example, the wheel hub 321 is pivotally mounted to a shaft/king pin 322 extending from the axle 320. In particular, this arrangement the king pin 322 is offset from the axis of the axle 320, thus producing either a positive or negative trail offset, depending upon the relative position of the king pin with respect to the axle axis, while maintaining the king pin 322 in-plane with the mid-plane of the vehicle. Therefore, it will be appreciated that in this example the shaft 322 is provided on an axis which is offset from the axis of the axle 320, which is different to the second example provided above where the shaft is provided on an axis which is substantially coincident with the axis of the axle.

In this example, it is possible to easily disassemble the wheel hub 321, as the centre of the hub is provided in two portions 324.1, 324.2. Thus, the bearings of the wheel may be removed, and the two portions 324.1, 324.2 decoupled in order to access the axle and king pin 322. This particular arrangement allows for ease of maintenance, however is not essential.

It will be appreciated that the arrangement of FIGS. 3A to 3F could be used in any vehicle or vehicle steering system of any one of the abovementioned examples 100, 200.

All of the above described components may be composed of any suitable material or composite, including any one or more of aluminium, carbon fibre, titanium, magnesium, or the like.

Furthermore, the above described features may be provided installed in a vehicle, for example as described with references to FIGS. 1, 2A to 2L, and 3A to 3F. Alternatively, the features described above may be provided in a vehicle steering system. In this regard, the vehicle steering system may be for the purpose of building a vehicle including a chassis, or retrofitting an existing vehicle including a chassis.

In one example, the vehicle steering system would include features as described above, including a first swing arm assembly, one or more wheel support aims, an axle, a wheel hub, a second swing arm assembly, a support member, one or more steering arms having, a steering input, a steering coupling, and a shock absorber.

It will be appreciated that a vehicle 100, 200, and in particular a vehicle steering system with the above described examples, provides for increased stability and robustness, and improved suspension and steering performance.

Thus, vehicle and in particular the steering system, reduces the king pin load stress in comparison to previous arrangements by creating a super strong triangulated unit that can carry loads hundreds of times its own weight while reducing the unsprung mass on the wheel. This super strong unit reduces stress loads that can cause unbalanced harmonic oscillations which can turn into a deadly tank slapper which can violently rip the handlebars from a riders grasp and lead to a potentially fatal crash.

The sum of all the forces on the suspension joints (including king pin) reduces the stability of the front end. The super strong triangulated unit creates a virtual king pin that extends from the hub centre steering unit to the second end of the second swing arm assembly (top swing arm). This virtual king pin relieves all stresses usually associated with the king pin of previous versions and disperses wheel load forces evenly between the upper and lower swing arm assemblies and directly to the centre of gravity of the vehicle.

Many previous HCS designs do not have, or have limited, capacity to change the 'rake and trail' or the 'dive/anti-dive' capabilities, thus limiting their setups to being able to handle only certain situations and dynamic behaviours. In contrast, the above examples are able to embrace any amount of 'dive/anti-dive' and 'rake and trail' permutations while retaining the desired stability of the vehicle.

In previous arrangements, any perturbations of the front wheel during the braking phase are largely due to an excess of anti-dive. The above described examples can be modified to a greater extent than previous systems to combat any dive or anti-dive perturbations occurring on the front wheel. The added triangulation of the system make it less likely than previous designs to exhibit oscillatory behaviour under braking.

The load path from the front wheel to the center of gravity of the vehicle is reduced by dispersing it in a shorter distance than telescopic and some previous hub centre systems. This also lowers the centre of gravity of the motorcycle which leads to greater mass centralisation, which is also beneficial in terms of stability, steering and handling.

Because of the reduction of the lateral width of the wheel support arms, (as compared to previous systems) and the height the wheel support arms assume to the rear of the front wheel, both ground clearance in high lean angles and the turning angle of the front wheel on the steering axis are greatly improved.

The system can have aerodynamic properties directly incorporated into the triangulated system which can keep the contact patch of the wheels on the ground longer than previous systems which leads to greater stability and safety. That is, if the front wheel attempts to lift from the ground plane, the aerodynamic qualities of the structure and triangulated shape can reduce the propensity of this lift.

A number of experiments were performed in order to demonstrate the performance of the abovementioned vehicle steering system, and the results are discussed in more details below.

Figure 4:
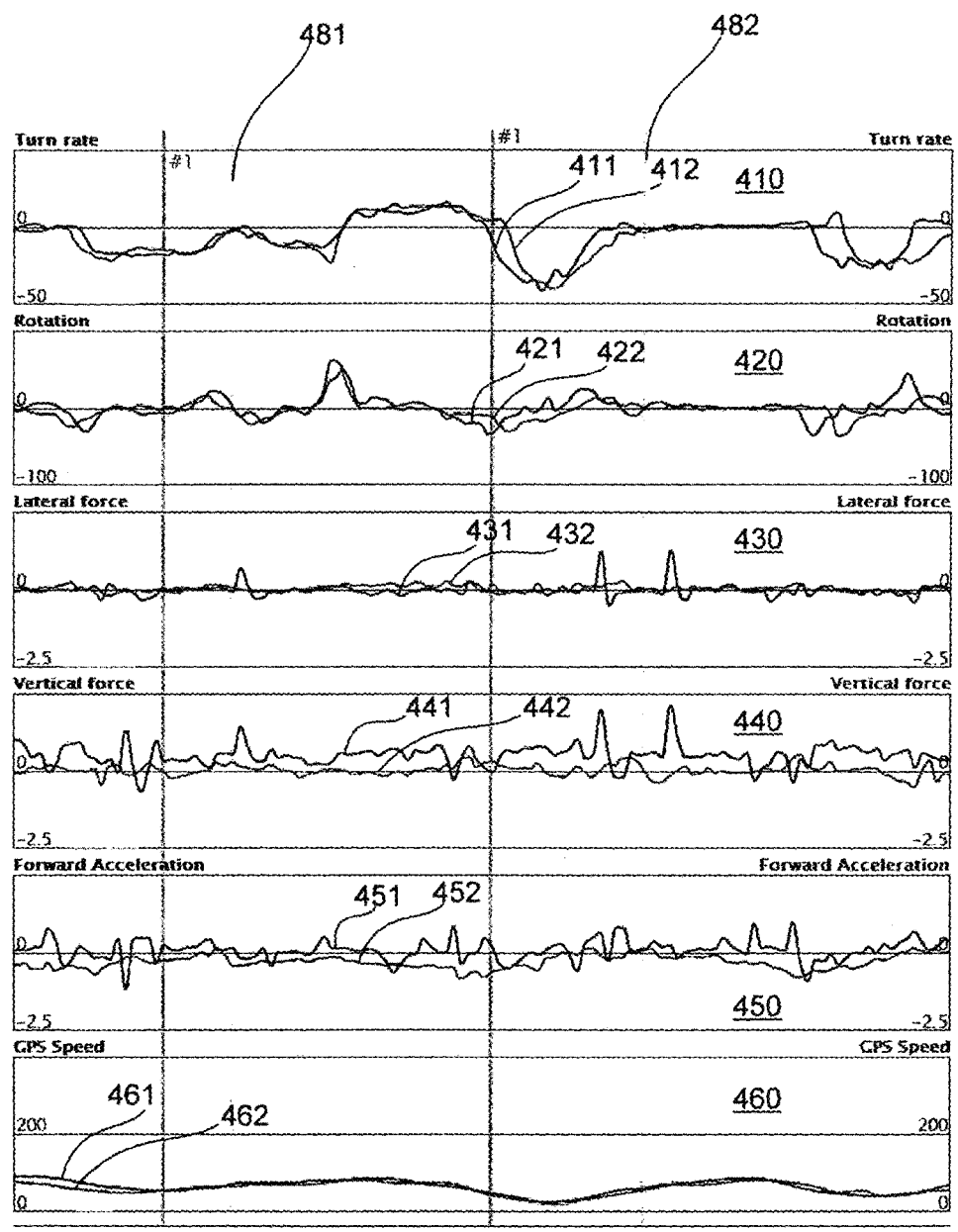
FIG. 4 is a number of graphical traces of examples of the performance of a motorbike similar to the examples of FIGS. 2A to 2O compared to a conventional motorbike.

In particular, the performance of a motorbike similar to FIGS. 2A to 2O (hereinafter 'the prototype') and using on a modified Ducati 900 Supersport engine, was compared to a conventional motorbike, namely a Suzuki GSZ 750 R, on a track using sensors positioned on each motorbike, and the resultant traces are shown in FIG. 4.

In this example, six traces were obtained for the prototype 411, 421, 431, 441, 451, 461 and the conventional motorbike 412, 422, 432, 442, 452, 462, using a combination of accelerometers, a gyroscope, and a global positioning system (GPS).

The traces shown in FIG. 4 include relate to turn rate 410 (prototype 411 and conventional motorbike 412), rotation or lean angle 420 (prototype 421 and conventional motorbike 422), lateral force 430 (prototype 431 and conventional motorbike 432), vertical force 440 (prototype 441 and conventional motorbike 442), forward acceleration 450 (prototype 451 and conventional motorbike 452) and GPS speed 460 (prototype 461 and conventional motorbike 462). The horizontal axes of the traces correspond to distance, with first and second markers 481, 482 corresponding to respective first and second locations on the track.

The traces demonstrate that the prototype exhibits a better turn rate while cornering without requiring the same degree of lean angle, or rotation, as the conventional motorbike. In addition, the traces show that the prototype is able to brake later into corners, and rotate out of corners for a faster exit, ensuring that less speed is lost during cornering when compared with the conventional motorbike. In fact, in this particular experiment, in general the prototype was able to corner almost 1 sec faster than the conventional motorbike.

Therefore, FIG. 4 demonstrates that the prototype outperforms the conventional motorbike, and in particular highlights that the prototype has a higher turn rate for less lean, creating a faster corner speed and time. This also results in a safer bike, with enhanced handling characteristics.

Throughout this specification and claims which follow, where an arrangement has been described as at a first or second end, this is intended to also include arrangements which are proximal to a first or second end. Therefore, the terms "at a first end" or "at a second end" or "at an end" should be understood to encompass both "at", and proximate to, the respective end.

Also throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described. Thus, for example, it will be appreciated that features from different examples above may be used interchangeably where appropriate.

The claims defining the invention are as follows:

1. A vehicle including:
   a) a body;
   b) a first swing arm assembly including a first end pivotally mounted to the body;
   c) at least one wheel support arm including a first end pivotally mounted to a second end of the first swing arm assembly;
   d) an axle coupled to a second end of the at least one wheel support arm;
   e) a wheel hub pivotally mounted to the axle, the wheel hub rotatably supporting at least one wheel in use;
   f) a second swing arm assembly including a first end pivotally mounted to the body;
   g) a support member pivotally mounted to a second end of the second swing arm assembly and at least one of:
      i) a first end of the at least one wheel support arm; and,
      ii) pivotally mounted to a second end of the first swing arm assembly;
   h) at least one steering arm having a first end pivotally connected to the support member and a second end coupled to the wheel hub, wherein the at least one steering arm, the at least one wheel support arm, and the support member are provided in a substantially stable triangular arrangement;
   i) a steering input pivotally mounted to the body; and,
   j) a steering coupling for connecting the at least one steering arm to the steering input.

2. A vehicle according to claim 1, wherein the at least one steering arm and the wheel hub pivot about a steering axis, the steering axis being parallel with a mid-plane of the vehicle.

3. A vehicle according to claim 1, wherein the at least one wheel support arm pivots relative to the first swing arm assembly about an axis extending perpendicularly relative to a mid-plane of the vehicle.

4. A vehicle according to claim 1, wherein the second swing arm assembly pivots relative to the body about an axis extending perpendicularly relative to a mid-plane of the vehicle.

5. A vehicle according to claim 1, wherein the support member pivots relative to the second end of at least one of the first swing arm assembly and the second swing arm assembly about an axis extending perpendicularly relative to a mid-plane of the vehicle.

6. A vehicle according to claim 1, wherein the vehicle includes at least one support strut coupled to the support member and the wheel support arm.

7. A vehicle according to claim 1, wherein the support member and the second end of the second swing arm assembly are pivotally mounted via an adjustable coupling and wherein the adjustable coupling at least one of:
  a) allows a user to modify a relative position of a pivotal connection between the second end of the second swing arm assembly and the support member; and,
  b) includes a rotatable disc including the pivotal connection offset from a centre of the rotatable disc.

8. A vehicle according to claim 1, wherein the second swing arm assembly includes an extendable member for allowing a user to modify a length of the second swing arm assembly.

9. A vehicle according to claim 1, wherein the at least one steering arm is coupled to the support arm via an adjustable member and wherein the adjustable member allows a user to modify an orientation of a steering axis.

10. A vehicle according to claim 1, wherein at least one of an adjustable coupling, an extendable member, and an adjustable member, allow the user to modify at least one of a rake angle, a trail angle, a steering axis angle and a degree of dive or anti-dive.

11. A vehicle according to claim 1, wherein the first swing arm assembly includes laterally spaced swing arms, which in use are positioned on either side of a mid-plane of the vehicle and wherein the two first swing arms are coupled together via any one of:
  a) at least one axle; and,
  b) at least one strut, wherein the strut is any one of:
    i) integrally formed with the first swing arms; and,
    ii) mounted to the first swing arms and wherein the at least one second swing arm assembly includes any one of:
      (1) a substantially 'V'-shaped member; and
      (2) two second swing arms.

12. A vehicle according to claim 1, wherein the first swing arm assembly and the second swing arm assembly are spaced apart in a direction parallel with a mid-plane of the vehicle.

13. A vehicle according to claim 1, wherein the at least one wheel support arm includes two wheel support arms provided on opposing sides of the wheel coupled together at first ends.

14. A vehicle according to claim 1, wherein the steering coupling allows for relative movement between the steering input and the at least one steering arm and wherein the steering coupling includes any one of:
  a) at least one shear link;
  b) at least one push rod; and,
  c) at least one telescoping tube.

15. A vehicle according to claim 1, wherein the at least one steering arm and the wheel hub pivot about a first steering axis parallel with a mid-plane of the vehicle, and wherein the steering input pivots relative to the body about a second steering axis parallel with the mid-plane and wherein the first and second steering axes are any one of:
  a) co-axial;
  b) parallel; and,
  c) not co-axial and not parallel.

16. A vehicle according to claim 1, wherein the vehicle includes a shock absorber coupled to the body and any one of the first swing arm assembly and the second swing arm assembly, wherein the shock absorber includes a compressible portion to allow the first and second swing arm assemblies to pivot relative to the body when the compressible portion is compressed.

17. A vehicle according to claim 1, wherein the wheel hub is mounted to a shaft extending from the axle and wherein the shaft is provided on an axis which is any one of:
  a) substantially coincident with an axis of the axle; and,
  b) offset from the axis of the axle.

18. A vehicle according to claim 1, wherein the vehicle includes hub centre steering.

19. A motorbike including:
  a) a body;
  b) a first swing arm assembly including a first end pivotally mounted to the body;
  c) at least one wheel support arm including a first end pivotally mounted to a second end of the first swing arm assembly;
  d) an axle coupled to a second end of the at least one wheel support arm;
  e) a wheel hub pivotally mounted to the axle, the wheel hub rotatably supporting at least one wheel in use;
  f) a second swing arm assembly including a first end pivotally mounted to the body;
  g) a support member pivotally mounted to a second end of the second swing arm assembly and at least one of:
    i) a first end of the at least one wheel support arm; and,
    ii) pivotally mounted to a second end of the first swing arm assembly;
  h) at least one steering arm having a first end pivotally connected to the support member and a second end coupled to the wheel hub, wherein the at least one steering arm, the at least one wheel support arm, and the support member are provided in a substantially stable triangular arrangement;
  i) a steering input pivotally mounted to the body; and,
  j) a steering coupling for connecting the at least one steering arm to the steering input.

20. A vehicle steering system for a vehicle including a body, the steering system including:
  a) a first swing arm assembly including a first end pivotally mounted to a body;
  b) at least one wheel support arm including a first end pivotally mounted to a second end of the first swing arm assembly;
  c) an axle coupled to a second end of the at least one wheel support arm;
  d) a wheel hub pivotally mounted to the axle, the wheel hub rotatably supporting at least one wheel in use;
  e) a second swing arm assembly including a first end pivotally mounted to the body;
  f) a support member pivotally mounted to a second end of the second swing arm assembly and at least one of:
    i) a first end of the at least one wheel support arm; and,
    ii) pivotally mounted to a second end of the first swing arm assembly;
  g) at least one steering arm having a first end pivotally connected to the support member and a second end coupled to the wheel hub, wherein the at least one steering arm, the at least one wheel support arm, and the support member are provided in a substantially stable triangular arrangement;
  h) a steering input pivotally mounted to the body; and,
  i) a steering coupling for connecting the at least one steering arm to the steering input.

\* \* \* \* \*